US006650686B1

(12) United States Patent
Kondo

(10) Patent No.: US 6,650,686 B1
(45) Date of Patent: Nov. 18, 2003

(54) SPREAD SPECTRUM COMMUNICATION SYSTEM AND HANDOVER METHOD THEREIN

(75) Inventor: Takayuki Kondo, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/361,359

(22) Filed: Jul. 27, 1999

(30) Foreign Application Priority Data

Jul. 31, 1998 (JP) .......................................... 10-217895

(51) Int. Cl.[7] .............................................. H04B 1/69
(52) U.S. Cl. ...................... 375/130; 375/133; 375/140; 375/356; 370/342; 455/441; 455/442
(58) Field of Search ................................ 375/130, 133, 375/135, 136, 140, 146, 147, 256, 356; 370/331, 332, 342; 455/441, 442

(56) References Cited

U.S. PATENT DOCUMENTS

| | | | | |
|---|---|---|---|---|
| 5,483,668 A | * | 1/1996 | Malkamaki et al. | ........ 455/441 |
| 5,677,908 A | * | 10/1997 | Oura | ........................... 37/331 |
| 6,285,668 B1 | * | 9/2001 | Kang | ......................... 370/331 |
| 6,320,855 B1 | * | 11/2001 | Shi | ............................. 370/332 |

FOREIGN PATENT DOCUMENTS

| | | |
|---|---|---|
| JP | 9-275582 | 10/1997 |
| JP | 10-93532 | 4/1998 |
| JP | 10-94041 | 4/1998 |
| JP | 10-126380 | 5/1998 |

* cited by examiner

Primary Examiner—Suwang Liu
(74) Attorney, Agent, or Firm—Foley & Lardner

(57) ABSTRACT

A spread spectrum communication system includes at least one mobile station and a plurality of base stations for communicating with mobile stations in sites thereof by a spread spectrum scheme. Each base station includes an accumulation section and calculation section. The accumulation section accumulates a reception timing difference indicating the difference in reception timing between a transmission signal from a mobile station in a base station in an adjacent site and a transmission signal from the mobile station in a self-station. The calculation section obtains the reception timing of the transmission signal from the mobile station in the self-station by using the reception timing difference between the self-station and a handover source base station in an adjacent site, which is accumulated in the accumulation section, when the self-station become a handover destination base station upon handover of the mobile station between adjacent sites.

18 Claims, 14 Drawing Sheets

SPREAD SPECTRUM COMMUNICATION SYSTEM AND HANDOVER METHOD THEREIN

BACKGROUND OF THE INVENTION

The present invention relates to a spread spectrum communication system and handover method therein and, more particularly, to a spread spectrum communication system and handover method therein, which can quickly demodulate signals in a mobile station or handover destination site without performing a path search in a wide range.

With recent advances in mobile communication systems, so-called multiple access techniques of connecting a plurality of mobile stations to one base station to allow users as many as possible to simultaneously communicate within a limited frequency band have been developed.

As one of such multiple access schemes, a circuit switching scheme of holding the connection state set between two stations that communicate with each other up to the end of communication is popular.

This circuit switching scheme includes FDMA (Frequency Division Multiple Access) as a multiple access scheme using frequency division, which divides a frequency and allows users to respectively use the divided frequencies. TDMA (Time Division Multiple Access) or the like is also available, in which a plurality of channels ensured by dividing time into small units are allocated to users.

Demands, however, have arisen for further improvements in current communication techniques, and more specifically, improvements in frequency use efficiency, security, interference resistance, and the like.

As a multiple access scheme capable of improving security, interference resistance, and the like by coding signals in channels as compared with FDMA, TDMA, and the like, a multiple access scheme called CDMA (Code Division Multiple Access) or SSMA (Spread Spectrum Multiple Access) is available.

In the past, the frequency use efficiency of spread spectrum multiple access was recognized to be lower than that of FDMA, TDMA, and the like. With advances in technology, we do not have such recognition any more and consider this technique as a technique capable of improving the frequency use efficiency.

In CDMA or SSMA, owing to coding processing, the bandwidth (frequency spectrum) of each narrow-band channel multiplies 10- to 100-fold.

With this technique, a plurality of signals having a spread frequency spectrum share the same band, but the respective channels are identified by differences in code pattern.

By executing operation (despreading) reverse to the coding processing that has been executed, the band of each channel is restored to the initial narrow band.

In this case, since the frequency spectra of signals from other stations are kept spread, a small component is left as noise in each signal restored to the narrow band.

Since this code pattern is complicated, it is difficult to decode the code. This also provides a kind of encryption communication.

In addition, a mobile communication system based on the spread spectrum scheme spreads/modulates an information signal with pseudo-orthogonal code (e.g., a PN code).

Reception waves can therefore be received with a precision corresponding to the spread code rate, and reflected waves with different propagation delays can be selectively received.

In addition, if a plurality of reception signals (multipath) with different propagation delays are selectively received and synthesized (RAKE synthesis), the resistance to multipath fading can be increased as compared with a conventional scheme of receiving only principal waves (e.g., the TDMA scheme).

In CDMA or SSMA, however, each path must be acquired with a precision corresponding to the spread code rate, and hence a high-precision path acquisition function is required.

When the phase timing of a spread code for a transmission signal coincides with that of a spread code for a receiver, a reception power peak appears.

Whether a path is acquired can be checked by detecting such a reception power peak.

For example, a phase timing at which a peak appears is detected while the phase timing of a spread code for the receiver is shifted in units of chips. This is called a path search function.

When a mobile station and base station start communication with each other, since the location of the mobile station in a site is unknown, a path search is made in a reception timing window range in which there is a possibility that a reception wave propagates. This operation is called path acquisition.

Once a path is acquired, the reception timing window is narrowed, and path detection is performed in this range. This operation is called path tracking.

Since this reception timing varies depending on the radio wave propagation time between a base station and mobile station, the reception timing changes when the mobile station moves to an adjacent site in handover.

For this reason, path acquisition must be performed again in handover between sites.

In handover, a short break occurs during execution of path acquisition because no signal can be received from the mobile station.

In the worst case, no path can be acquired, and handover may fail.

In addition, during soft handover, selective diversity cannot be performed during the execution of path acquisition.

An example of the arrangement of a conventional spread spectrum communication system will be described below with reference to FIG. 14.

FIG. 14 shows the arrangement of a conventional spread spectrum communication system.

As is obvious from a comparison between FIG. 14 and FIG. 1 showing the arrangement of the first embodiment of a spread spectrum communication system according to the present invention, the prior art shown in FIG. 14 differs from the first embodiment of the spread spectrum communication system according to the present invention only in that each base station does not include a reception timing difference calculating section 183.

A description of an example of the conventional spread spectrum communication system in FIG. 14 overlaps that of the first embodiment of the spread spectrum communication system according to the present invention in FIG. 1, and hence will be omitted.

As the first example of the prior art in which the field of the invention is similar to that in the present invention, "Synchronization Establishment Method for Spread Code in Mobile Communication System, Mobile Station Equipment, and Base Station Equipment" disclosed in Japanese Patent Laid-Open No. 9-275582 is presented.

According to the first example of the prior art, to quickly and efficiently perform soft handover, phase information about a spread code in a communication channel transmitted from a soft handover destination base station is received and the received phase information is notified to a soft handover source base station before a start-up of soft handover.

As the second example of the prior art in which the field of the invention is similar to that of the present invention, "Mobile Communication Reception Method and Device" disclosed in Japanese Patent Laid-Open No. 10-93532 is presented.

According to the second example of the prior art, when a plurality of signals each having a sufficient energy to be allocated for demodulation are received, it can be determined whether the signals are transmitted from the sector transmitter of the same base station or from another base station.

In addition, as the third example of the prior art in which the field of the invention is similar to that in the present invention, "Initial Synchronization Method in Asynchronous Cellular System between DS-CDMA Base Station and Receiver" disclosed in Japanese Patent Laid-Open No. 10-126380 is presented.

According to the third example of the prior art, in an initial site search, a long code timing is detected by using a matched filter, and a long code is specified using the long code timing detected by a plurality of parallel-connected correlators, thereby realizing a high-speed initial site search.

As described above, various spread spectrum mobile communication systems have been proposed. In a conventional spread spectrum mobile communication system, as described above, in handover between sites (handover in this specification includes both soft handover and hard handover), the reception timing of a reception wave in a handover destination site differs from that in a handover source site.

For this reason, in the handover destination site, a reception timing must be obtained by making a new search in a wide range up to the maximum propagation delay in the site. In hard handover, no signal can be received from a mobile station during execution of path acquisition, resulting in a short break.

In the worst case, no path can be acquired, and handover may fail.

In addition, in soft handover, selective diversity cannot be used during execution of path acquisition.

Furthermore, in the conventional spread spectrum communication system, each mobile station requires a 1-frame search time for a reception timing, e.g., 10 ms, resulting in a long period of processing time.

In the conventional spread spectrum communication system, a mobile station makes a cell search in the following manner.

1. The power to the mobile station is turned on.
2. A perch channel exhibiting the highest reception level at that point is received with a common spread code, and this perch channel is regarded as a main perch channel.
3. Perch channels from neighboring sites are received to prepare for handover to a neighboring site.
4. When "main perch channel reception level" becomes lower than "perch channel reception level in neighboring site exhibiting highest reception level", handover is performed to the neighboring site exhibiting the highest perch channel reception level.

A cell search made by a mobile station in such a conventional spread spectrum communication system is described in detail in "Reception Method and Apparatus in CDMA Radio Communication" disclosed in Japanese Patent Laid-Open No. 10-94041 and "Initial Synchronization Method and Receiver in DS-CDMA Base Station asynchronous Cellular System" disclosed in Japanese Patent Laid-Open No. 10-126380 (described above).

As described above, in a cell search made by a mobile station in the conventional spread spectrum communication system, although the transmission timing of a perch channel in each sector of a base station in the same cell (base station) is known, the transmission timings of perch channels are asynchronous (vary) among cells (base stations). For this reason, a reception timing must be detected again from an unknown state for another cell (base station).

For this reason, it takes a long processing time to receive perch channels of other cells (base stations) (about six cells in general).

SUMMARY OF THE INVENTION

The present invention has been made in consideration of the above situation, and has as its object to provide a spread spectrum communication system which accumulates past reception timing differences in handover between sites, and corrects a reception timing in a handover destination site in handover between sites with the accumulated reception timing differences, thereby quickly demodulating signals in a handover destination site without making a path search in a wide range, and a handover method in the spread spectrum communication system.

It is another object of the present invention to provide a spread spectrum communication system which accumulates past reception timing differences in handover between sites, and corrects a reception timing in a mobile station in handover between sites with the accumulated reception timing differences, thereby quickly demodulating signals in the mobile station without making a path search in a wide range, and a handover method in the spread spectrum communication system.

In order to achieve the above objects, according to the present invention, there is provided a spread spectrum communication system comprising at least one mobile station and a plurality of base stations for communicating with mobile stations in sites thereof by a spread spectrum scheme, each of the base stations including accumulation means for accumulating a reception timing difference indicating a difference in reception timing between a transmission signal from a mobile station in a base station in an adjacent site and a transmission signal from the mobile station in a self-station, and calculation means for obtaining a reception timing of the transmission signal from the mobile station in the self-station by using a reception timing difference between the self-station and a handover source base station in an adjacent site, which is accumulated in the accumulation means, when the self-station become a handover destination base station upon handover of the mobile station between adjacent sites.

DESCRIPTION OF THE PREFERRED EMBODIMENTS

Embodiments of a spread spectrum communication system and handover method in the spread spectrum communication system according to the present invention will be described next with reference to the accompanying drawings.

The first embodiment of the spread spectrum communication system according to the present invention will be described first with reference to FIG. 1.

Figure 1:
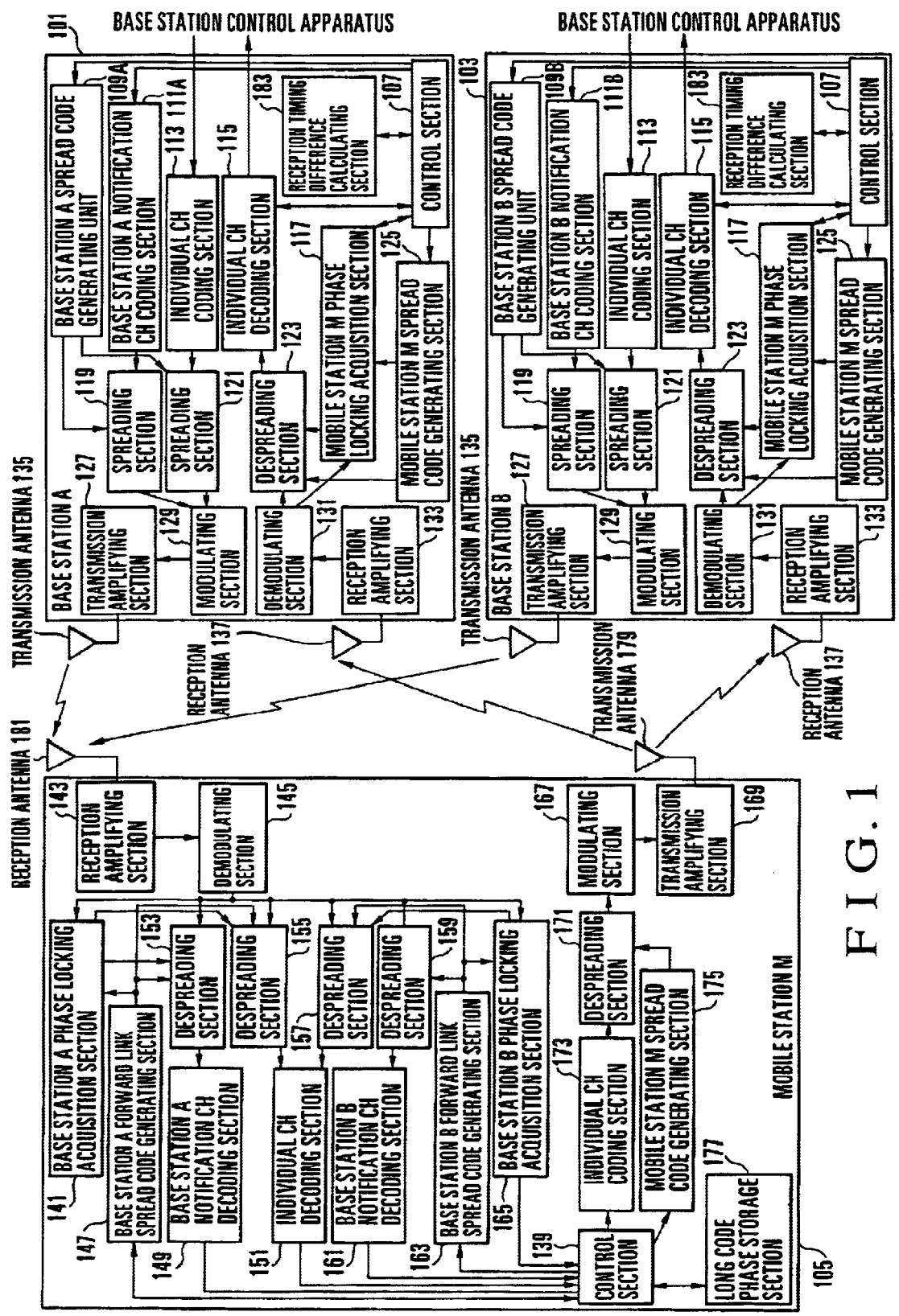
FIG. 1 is a block diagram showing the arrangement of the first, second, and third embodiments of a spread spectrum communication system according to the present invention.

FIG. 1 shows the arrangement of the first embodiment of the spread spectrum communication system according to the present invention.

Note that the first embodiment of the spread spectrum communication system according to the present invention will be described below with reference to FIG. 1, together with the first embodiment of the handover method in the spread spectrum communication system according to the present invention.

The first embodiment of the spread spectrum communication system according to the present invention is comprised of a base station A 101, base station B 103, and mobile station M 105, as shown in FIG. 1.

However, the numbers of base stations and mobile stations included in the first embodiment of the spread spectrum communication system according to the present invention are not limited to two and one, respectively, as in FIG. 1, and may be arbitrarily set.

The schematic arrangements of the base station A 101, base station B 103, and mobile station M 105 will be further described below with reference to FIG. 2.

Figure 2:
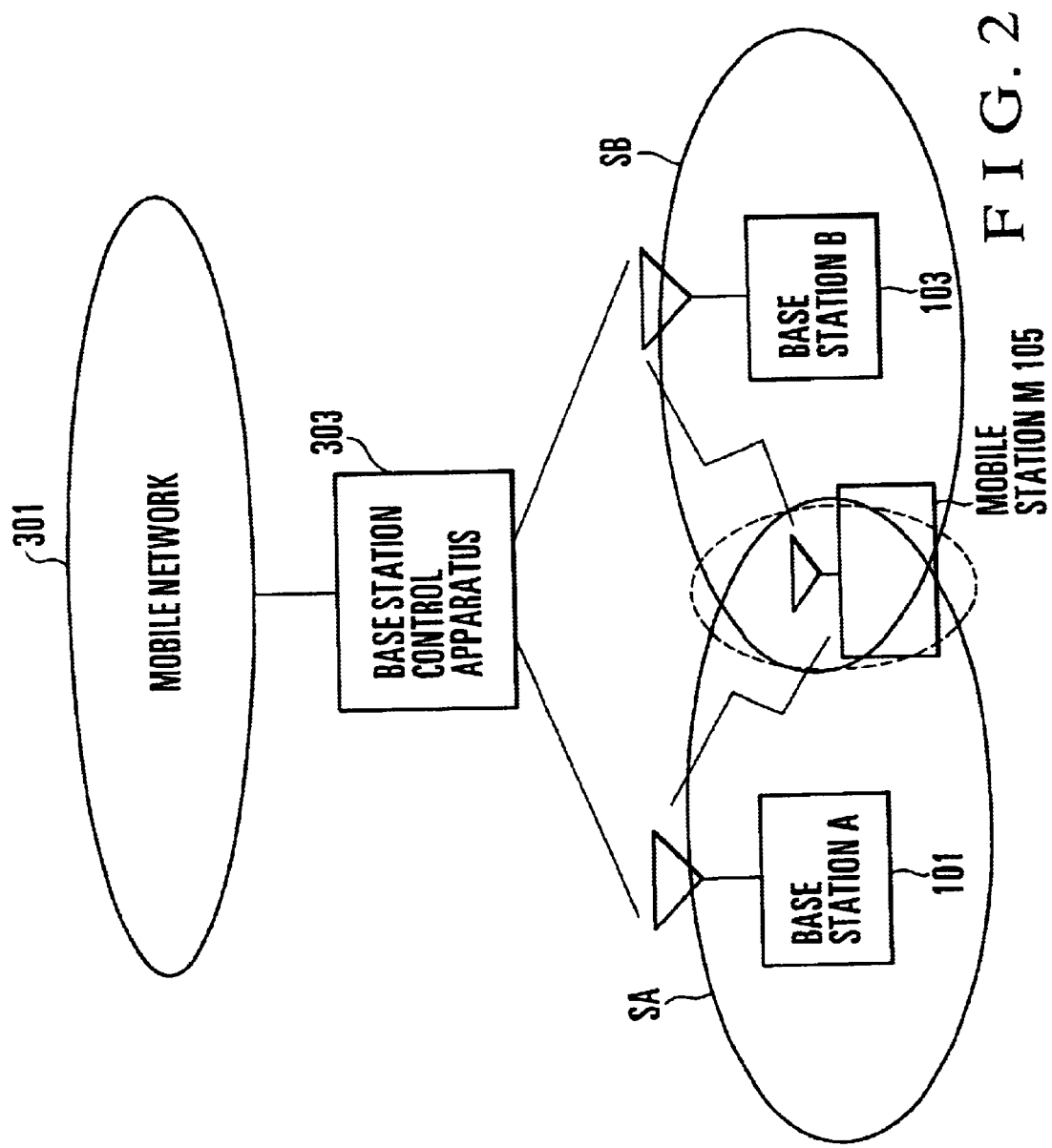
FIG. 2 is a view showing the schematic arrangement of the first embodiment of the spread spectrum communication system according to the present invention.

FIG. 2 shows the schematic arrangement of the first embodiment of the spread spectrum communication system according to the present invention.

As shown in FIG. 2, in brief, in the first embodiment of the spread spectrum communication system according to the present invention, both the base station A 101 for transmitting/receiving signals to/from the mobile station M 105 and the base station B 103 for transmitting/receiving signals to/from the mobile station M 105 are connected to a base station control apparatus 303, and the operation of each base station is controlled by the base station control apparatus 303.

The base station control apparatus 303 is connected to a mobile network 301.

In this case, reference symbol SA denotes the site of the base station A 101; and SB, the site of the base station B 103.

In this specification, a "site" is synonymous with a "cell".

The schematic arrangement of the first embodiment of the spread spectrum communication system according to the present invention shown in FIG. 2 is an example, and the present invention is not limited to this arrangement.

For example, the numbers of base stations, mobile stations, base station control apparatuses, and the like are not limited those in FIG. 2, and may be arbitrarily set.

The arrangement of the first embodiment of the spread spectrum communication system according to the present invention will be described in more detail next with reference to FIG. 1.

As shown in FIG. 1, the base station A 101 has a control section 107.

The control section 107 instructs a base station A spread code generating unit 109A to generate a base station A spread code, and notifies a base station A notification CH coding section 111A of a long code frame number representing the phase information of a long code in the base station A 101.

In addition, when the base station A 101 is a handover destination in handover operation, the control section 107 receives a long code phase difference between the handover destination and handover source and the reception timing in the base station as the handover source, which are sent from the handover source through the base station control apparatus.

When the base station A 101 is a handover destination in handover operation, the control section 107 sets a reception timing reflecting a reception timing difference, which is the difference in reception timing between the base station as the handover source and the base station A 101, in a mobile station M phase locking acquisition section 117.

When the base station A 101 is a handover source in handover operation, the control section 107 obtains the reception timing in the base station A 101 from the mobile station M phase locking acquisition section 117, and causes a reception timing difference calculating section 183 to calculate the reception timing difference between the adjacent sites. The control section 107 also sets a long code phase difference for reception of a signal from the mobile station M 105 in the mobile station M phase locking acquisition section 117.

When the base station A 101 is a handover source in handover operation, the control section 107 sends the long code phase difference between the handover source and the handover destination, which is sent from the mobile station M 105, and the reception timing obtained by the mobile station M phase locking acquisition section 117 to the base station as the handover destination through the base station control apparatus 303.

The base station A 101 has the base station A spread code generating unit 109A for generating a spread code for the base station A 101 and sending it to a spreading section 119.

The base station A 101 also includes the base station A notification CH coding section 111A for coding a long code frame number together with notification information, an individual CH coding section 113 for coding user individual information, e.g., a user signal, sent from the base station control apparatus 303, the spreading section 119 for spreading the signals generated by the base station A notification CH coding section 111A and individual CH coding section 113 with a base station A spread code, and a spreading section 121.

In addition, the base station A 101 includes the spreading section 119, a modulating section 129 for modulating the signal spread by the spreading section 121 into an RF signal, and a transmission amplifying section 127 for amplifying the modulated signal.

The base station A 101 also includes a transmission antenna 135 for transmitting the amplified signal, reception antenna 137 for receiving a signal from the mobile station M 105, reception amplifying section 133 for amplifying the signal received by the reception antenna 137, and demodulating section 131 for demodulating the signal received by the reception antenna 137.

The base station A 101 further includes a mobile station M spread code generating section 125 for generating a spread code for the mobile station M 105 under the control of the control section 107, the mobile station M phase locking acquisition section 117 for acquiring phase locking of the mobile station M 105 from the spread code in the mobile station M 105, which is generated by the mobile station M spread code generating section 125, and the demodulated signal, and notifying a despreading section 123 and the control section 107 of the acquired reception timing, and the despreading section 123 for despreading the signal demodulated from the reception timing acquired by the mobile station M phase locking acquisition section 117 and the spread code in the mobile station M 105 which is generated by the mobile station M spread code generating section 125.

The base station A 101 also includes an individual CH decoding section 115 for decoding a despread signal, sending it to the base station control apparatus 303, and notifying the control section 107 of the long code phase difference between the handover source and handover destination, which is included in the information decoded in handover operation.

The arrangement of the base station B 103 in FIG. 1 is the same as that of the base station A 101 described above, as shown in FIG. 1, and hence a description thereof will be omitted.

The arrangement of the mobile station M 105 in FIG. 1 will be described next.

The mobile station M 105 in FIG. 1 includes a reception antenna 181 for receiving a signal from each base station, reception amplifying section 143 for amplifying the received signal, and demodulating section 145 for demodulating the amplified signal.

The mobile station M 105 also includes a base station A forward link spread code generating section 147 for generating a notification channel spread code and individual channel spread code for the base station A 101, base station A phase locking acquisition section 141 for acquiring phase locking of the base station A 101 from the notification channel spread code in the base station A 101, which is generated by the base station A forward link spread code generating section 147, and a demodulated signal, and despreading section 153 for despreading the signal demodulated at the reception timing acquired by the base station A phase locking acquisition section 141 by using the notification channel spread code in the base station A 101 which is generated by the base station A forward link spread code generating section 147.

In addition, the mobile station M 105 includes a base station A notification CH decoding section 149 for decoding the signal despread with the notification channel spread code and sending the base station A long code included in the information to a control section 139, despreading section 155 for despreading the signal demodulated at the reception timing acquired by the base station A phase locking acquisition section 141 by using the individual channel spread code in the base station A 101 which is generated by the base station A forward link spread code generating section 147, base station B forward link spread code generating section 163 for generating a notification channel spread code and individual channel spread code for the base station B 103, and base station B phase locking acquisition section 165 for acquiring phase locking of the mobile station M 105 from the notification channel spread code in the mobile station M 105, which is generated by the base station B forward link spread code generating section 163, and the demodulated signal.

The mobile station M 105 further includes a despreading section 157 for despreading the signal demodulated at the reception timing acquired by the base station B phase locking acquisition section 165 by using the notification channel spread code in the base station B 103, which is generated by the base station B forward link spread code generating section 163.

In addition, the mobile station M 105 includes a base station B notification CH decoding section 161 for decoding the signal despread with the notification channel spread code in the base station B 103 and sending the base station A long code included in the information to the control section 139, and despreading section 159 for despreading the signal demodulated at the reception timing acquired by the base station B phase locking acquisition section 165 by using the individual channel spread code in the base station B 103, which is generated by the base station B forward link spread code generating section 163.

The mobile station M 105 also includes an individual CH decoding section 151 for decoding the signal despread with the individual channel spread code in the base station A 101, the signal despread with the individual channel spread code in the base station B 103, or the signal obtained by synthesizing the two signals, a long code phase storage section 177 for storing the long code frame number of a base station (e.g., the base station A 101) which is acquired for the first time when power is turned on, the control section 139 for obtaining the long code phase difference between a handover source and handover destination in handover operation and sending it to an individual CH coding section 173, and the individual CH coding section 173 for coding the long code phase difference between the handover source and handover destination in handover operation, together with individual channel information.

Furthermore, the mobile station M 105 includes a mobile station M spread code generating section 175 for generating a spread code for the mobile station M 105 designated by the control section 139 by using the long code phase designated by the control section 139, despreading section 171 for spreading the signal coded by the individual CH coding section 173 with the spread code generated by the mobile station M spread code generating section 175, modulating section 167 for modulating the spread signal, transmission amplifying section 169 for amplifying the modulated signal, and transmission antenna 179 for transmitting the amplified signal.

The operation of the first embodiment of the spread spectrum communication system according to the present invention in FIG. 1 will be described next with reference to FIGS. 1, 2, and 3.

Figure 3:
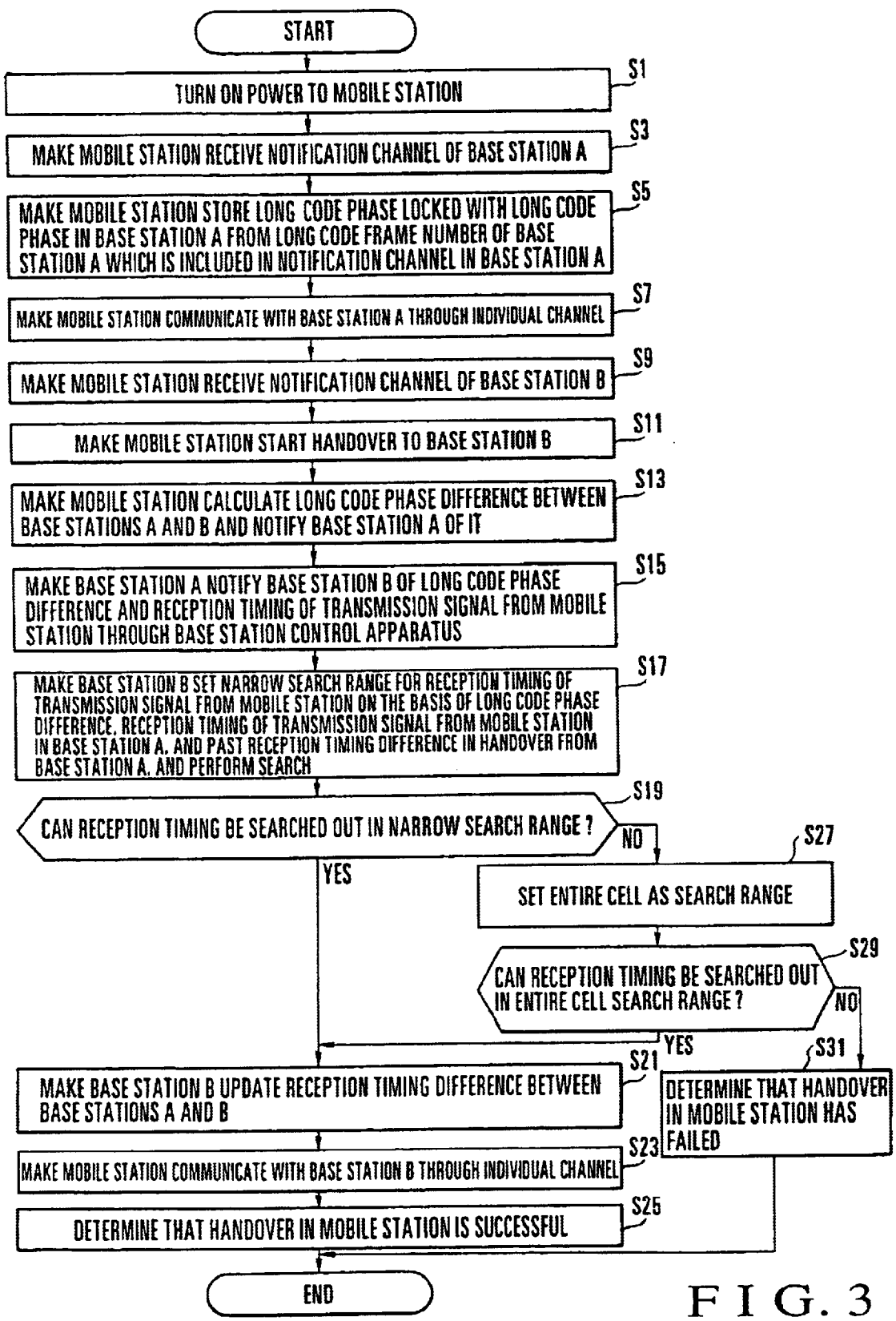
FIG. 3 is a flow chart showing the operation of the first embodiment of the spread spectrum communication system according to the present invention.

FIG. 3 shows the operation of the first embodiment of the spread spectrum communication system according to the present invention in FIG. 1.

Referring to FIG. 3, the operation of the first embodiment of the spread spectrum communication system in FIG. 1 starts when the mobile station M 105 turns the power on (step S1).

In step S3, the mobile station M 105 receives notification channels from base stations.

A long code phase locked with the long code phase in the base station A 101 is stored in the long code phase storage section 177 of the mobile station M 105 on the basis of the long code frame number of the base station A 101 which is included in the notification channel transmitted from the base station (e.g., the base station A 101) whose notification channel has the highest reception level of those of the notification channels received by the mobile station M 105 (step S5).

The mobile station M 105 then starts two-way communication with the base station A 101 through an individual channel (step S7).

The mobile station M 105 receives the notification channel of the base station B 103 near the base station A 101 which is communicating with the mobile station M 105 through the individual channel (step S9).

In step S11, the mobile station M 105 detects that the reception level of the notification channel of the base station B 103 exceeds the handover threshold, and notifies the base station control apparatus 303 of a start-up of handover from the base station A 101 to the base station B 103 through the base station A 101 by using an individual control channel.

Alternatively, the mobile station M 105 may send the reception levels of a plurality of notification channels of neighboring base stations to the base station control apparatus 303 through the base station A 101 by using the individual control channel to make the base station control apparatus 303 determine a start-up of handover.

The mobile station M 105 then obtains the difference in reception timing between the long code phase received from a base station (base station A 101 in this case) when power is turned on and stored in the long code phase storage section 177 and the long code frame number of the base station B 103, which is included in the notification channel of the base station B 103.

The mobile station M 105 notifies the base station A 101 of the obtained reception timing as the long code phase difference between the base station A 101 and base station B 103 by using the individual channel with the base station A 101 (step S13).

The base station A 101 notifies the base station B 103 of the long code phase difference between the base station A 101 and base station B 103, which is notified from the mobile station M 105, and the reception timing of the transmission signal from the mobile station M 105 at the base station A 101 through the base station control apparatus 303 (step S15).

The base station B 103 as a handover destination obtains a search range smaller than the site radius, which is used to search for the current reception timing of the transmission signal from the mobile station M 105 at the base station B 103, on the basis of the long code phase difference between the base station A 101 and base station B 103, the reception timing of the transmission signal from the mobile station M 105 at the base station A 101, and the difference between the reception timing of the transmission signal from the mobile station M 105 at the base station A 101 in handover from the past base station A 101 to the base station B 103 and the reception timing of the transmission signal from the mobile station M 105 at the base station B 103. The base station B 103 then performs a search in this search range (step S17).

In step S19, it is checked whether the reception timing of the signal from the mobile station M 105 has been searched out within the small search range.

If it is determined that the reception timing of the signal from the mobile station M 105 has been searched out within the small search range (YES), the difference between the reception timing of the transmission signal from the mobile station M 105 at the base station A 101 and the reception timing of the transmission signal from the mobile station M 105 at the base station B 103 is updated with the current difference between the reception timing of the transmission signal from the mobile station at the base station A 101 and the reception timing of the transmission signal from the mobile station M 105 at the base station B 103, which is used for next handover from the base station A 101 to the base station B 103 (step S21).

Figure 4:
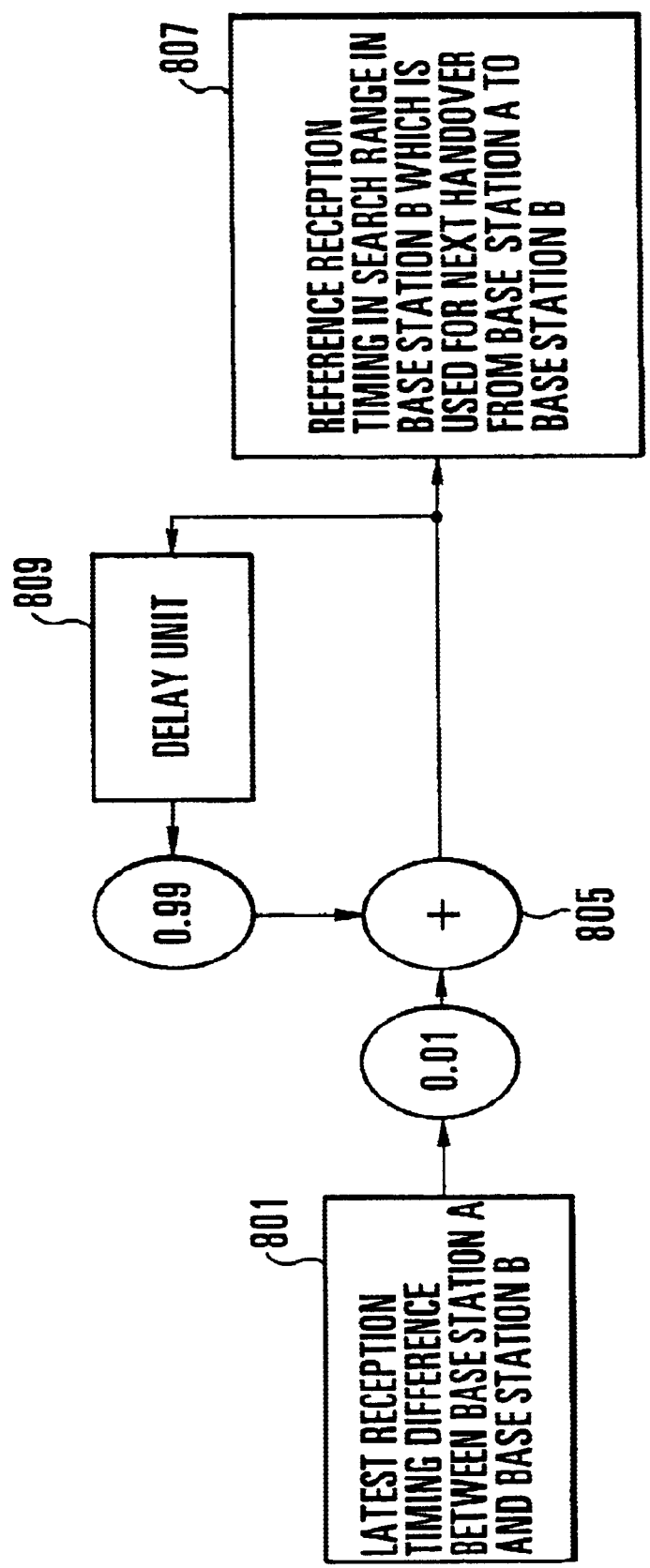
FIG. 4 is a schematic view showing weighted mean calculation in the spread spectrum communication system according to the present invention.

This update operation is performed by, for example, weighted mean calculation shown in FIG. 4.

FIG. 4 shows concept of weighted mean calculation in the spread spectrum communication system according to the present invention.

As shown in FIG. 4, a latest reception timing difference 801 between base stations A and B is multiplied by 0.01, and the product is input to an adder 805.

The output from the adder 805 serves as a reference reception timing 807 of the search range of the base station B 103, which is used in next handover from the base station A 101 to the base station B 103, and input to a delay unit 809.

The output from the delay unit 809 is multiplied by 0.99, and the product is input to the adder 805.

In this weighted mean calculation in FIG. 4, the reception timing difference 801 is multiplied by 0.01, and the output from the delay unit 809 is multiplied by 0.99. However, these magnifications are not limited to 0.01 and 0.99 and may be set to other appropriate values although the sum of the two magnifications is preferably 1.

The operation of this embodiment will be described next with reference to the flow chart of FIG. 3 again.

If it is determined in step S19 that the reception timing of the signal from the mobile station M 105 has not been searched out within the small search range (NO), the entire site (entire cell) range is searched (step S27).

In step S29, it is checked whether the reception timing of the signal from the mobile station M 105 has been searched out. If it is determined that the reception timing of the signal from the mobile station M 105 has been searched out (YES), the difference between the reception timing of the transmission signal from the mobile station M 105 at the base station A 101 and the reception timing of the transmission signal from the mobile station M 105 at the base station B 103 is updated with the current difference between the reception timing of the transmission signal from the mobile station M 105 at the base station A 101 and the reception timing of the transmission signal from the mobile station M 105 at the base station B 103, which is used for next handover from the base station A 101 to the base station B 103 (step S21).

This update operation is performed by, for example, weighted mean calculation shown in FIG. 4.

If it is determined in step S29 that the reception timing of the signal from the mobile station M 105 has not been searched out in the entire site range (NO), it is determined that handover from the base station A 101 to the base station B 103 has failed (step S31), and the handover processing is terminated.

If it is determined that the reception timing of the signal from the mobile station M 105 has been searched out, the mobile station M 105 starts communication with the base station B 103 by using the individual channel (step S23). It is then determined that handover is successful (step S25), and the handover processing is terminated.

The above handover operation will be further described next with reference to FIGS. 5 and 6.

Figure 5:
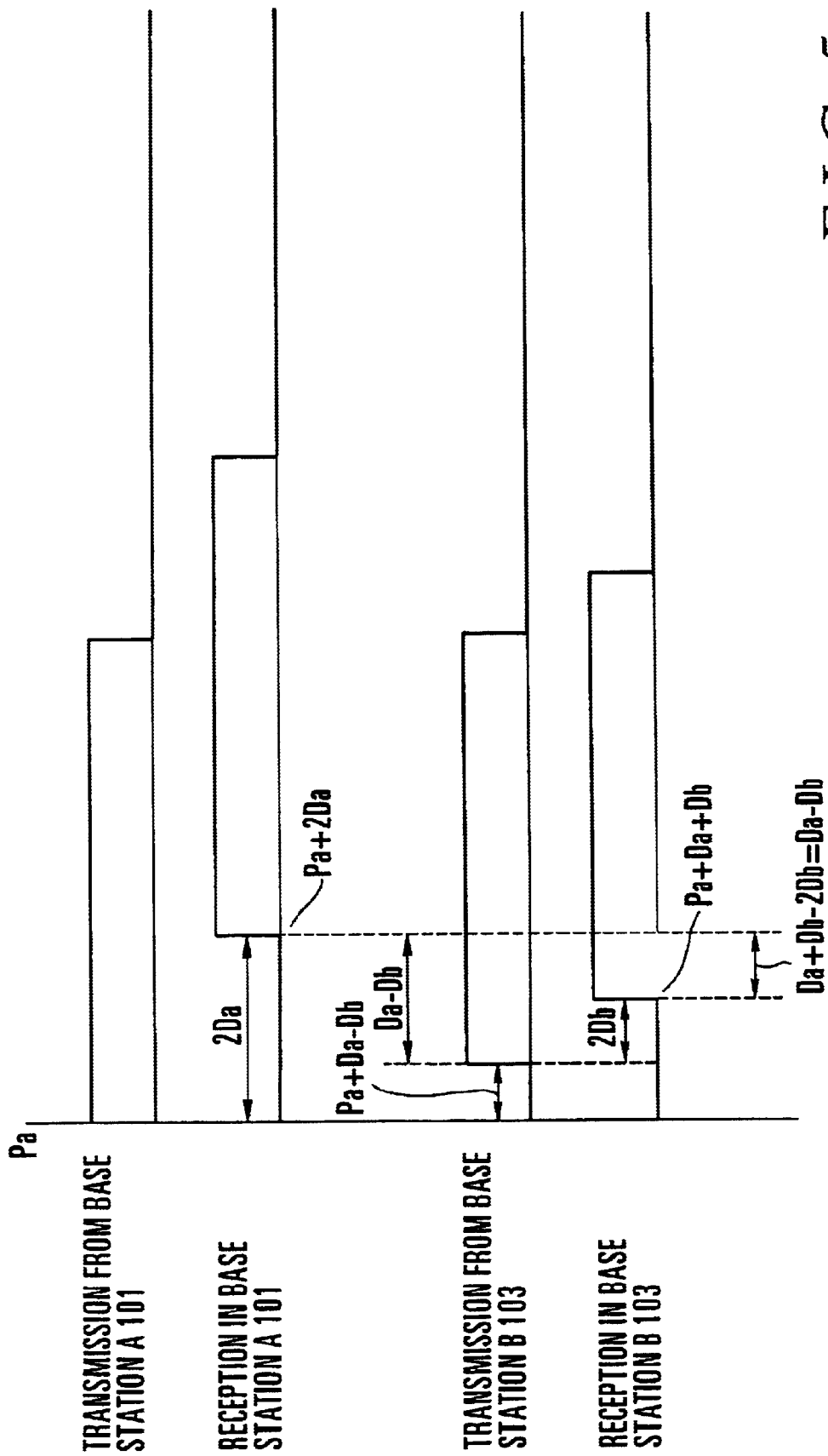
FIG. 5 is a timing chart showing an example of operation in handover in the spread spectrum communication system according to the present invention.
Figure 6:
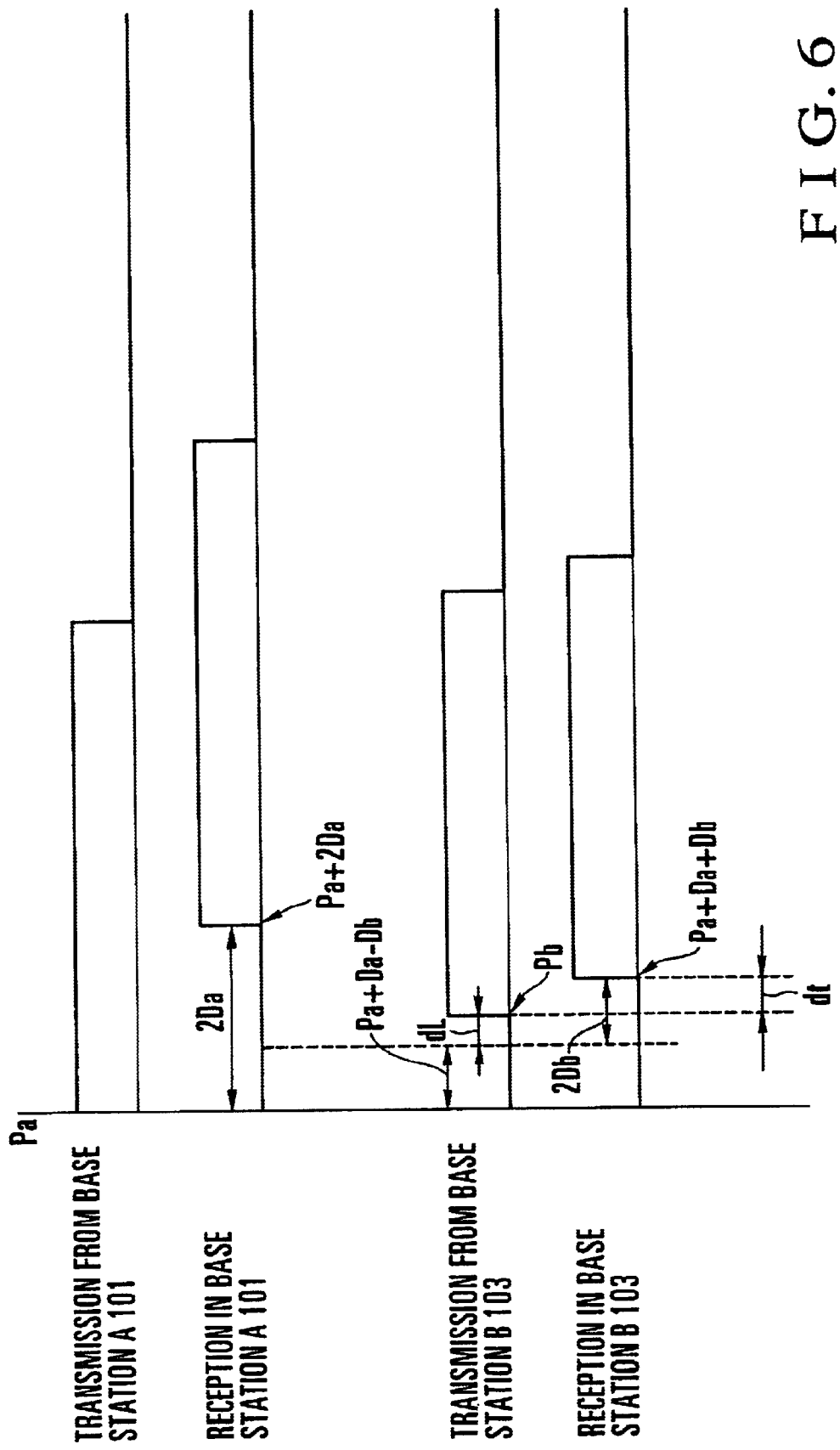
FIG. 6 is a timing chart showing an example of operation in handover in the spread spectrum communication system according to the present invention.

FIGS. 5 and 6 show the above handover operation.

As shown in FIG. 5, the base station A 101 transmits a spread code transmission request to the mobile station M 105.

Assume that a long code phase in the base station A 101 starts at time Pa when this spread code transmission request is transmitted.

The long code phase to be described below is a phase that circulates in a predetermined cycle with time without any correlation in each base station and each mobile station.

The long code phases in each base station and each mobile station can therefore be regarded as the times indicated by timepieces (the hands of the respective timepieces may indicate different times) independently installed in the respective base stations and mobile stations.

In the following description, "phase" will be described as "time", as needed.

All the timings shown in FIG. 5 are measured by the timepiece (long code phase) in the base station A 101.

Upon reception of the call originating request from the base station A 101, the mobile station M 105 immediately transmits the spread code.

Letting Da be the propagation time of radio waves between the base station A 101 and mobile station M 105, the time at which the mobile station M 105 actually receives the spread code transmission request transmitted from the base station A 101 is expressed as Pa+Da when measured with the timepiece (long code phase) in the base station A 101.

The mobile station M 105 generates a spread code at time Pa+Da, and keeps transmitting the generated spread code from time Pa+Da.

As is shown in FIG. 5 as well, when the mobile station M 105 immediately transmits the spread code, the time (reception timing) at which the spread code reaches the base station A 101 is represented as Pa+2Da when measured with the timepiece (long code phase) in the base station A.

According to the above description, the base station A 101 can synchronize with the spread code transmitted from the mobile station M 105 by generating a spread code identical to the spread code transmitted from the mobile station M 105 and multiplying the reception signal by the code at time Pa+2Da measured by the timepiece in the base station A 101.

In handover operation, the base station B 103 must synchronize with the spread code output from the mobile station M 105.

This operation will be described with reference to FIG. 5 by exemplifying the case wherein the propagation time of radio waves from the base station B 103 to the mobile station M 105 is Db, as shown in FIG. 5 as well.

As described above, the mobile station M 105, which is executing communication with the base station A 101, keeps transmitting the spread code at time Pa+Da measured with the timepiece (long code phase) in the base station A 101.

As shown in FIG. 5, therefore, to synchronize with the mobile station M 105, the base station B 103 must generate a spread code identical to the spread code in the mobile station M 105 and multiply the reception signal by the code at time Pa+Da+Db measured with the timepiece (long code phase) in the base station A 101.

That is, time Pa+Da+Db is the reception timing at the base station B 103.

In addition, since the reciprocating propagation time between the base station B 103 and mobile station M 105 is 2*Db, time Pb at which the base station B 103 must start communication is given as Pa+Da−Db.

The time at which the base station B 103 starts communicating with the mobile station M 105 (i.e., the time at which handover is executed) may be regarded completely at random.

This therefore poses the problem of how to calculate the reception timing in the base station B 103 from this random communication start time in the base station B 103.

A method of calculating a reception timing in this case according to the present invention will be described below with reference to FIG. 6.

The timing chart for the base station A 101 in FIG. 6 is identical to that for the base station A 101 in FIG. 5.

Communication start time Pb in the base station B 103 is delayed from time Pa+Da−Db, at which communication is to be started as described with reference to FIG. 5, by dL.

In this case, time Pb described above is the communication start time in the base station B 103, which is calculated with the timepiece of the base station A 101.

Since the difference between the times is required for the subsequent calculation, communication start time Pb1 in the base station B 103, which is measured with the timepiece (long code phase) in the base station B 103, can be regarded as communication start time Pb in the base station B 103, which is calculated with the timepiece in the base station A 101.

That is, Pb1 can be regarded as equal to Pb. More specifically, if the base station B 103 starts communicating with the mobile station M 105 (starts executing handover) at 3:00 (phase Pb1) measured with the timepiece (long code phase) in the base station B 103, it can be considered that the base station B 103 actually starts communicating with the mobile station M 105 at 3:00 (phase Pb) measured with the timepiece (long code phase) in the base station A 101.

As described above, in order to establish synchronization, the base station B 103 must measure the time with the timepiece (long code phase) in the base station A 101 and starts generating/multiplying a spread code at time Pa+Da+Db.

As shown in FIG. 6, letting dt be the time difference between communication start time Pb in the base station B 103 and reception start time Pa+Da+Db, dt=2Db−dL, as is apparent from FIG. 6.

The base station B 103 therefore generates/multiplies the spread code transmitted from the mobile station M 105 at the time delayed from time Pb, at which the base station B 103 starts communication, by dt. Hence, the reception time (reception timing) in the base station B 103 is given by $$Pb + dt = Pb + 2Db - dL \qquad (1)$$
$$= (Pb + 2Db) - (Pa + 2Da) + Pa + 2Da - dL$$

This reception time in the base station B 103 may be regarded as both the reception time measured with the timepiece (long code phase) in the base station A 101 and the reception time measured with the timepiece (long code phase) in the base station B 103.

The value "dL" in equation (1) will be described below.

As shown in FIG. 6, dL is the difference between Pb and Pa+Da−Db, and hence is given by dL=Pb+Db−(Pa+Da).

This value dL will be referred to as a long code phase difference hereinafter.

Long code phase difference dL=Pb+Db−(Pa+Da) can be detected in the mobile station M 105.

The base station B 103 can detect the long code numbers (e.g., 0 to 65535) included in the notification channels transmitted from the base stations A and B and the notification channels from the reception timing difference at the time of reception.

According to the above description, the reception time (reception timing) in the base station B 103 is determined by the reception timing difference (Pb+2Db)−(Pa+2Da) between the base station A 101 and base station B 103, the reception timing Pa+2Da of the base station A, and the long code phase difference dL.

A method of searching for the reception time in the base station B 103 will be described below.

Referring back to equation (1), the reception time is given by $$Pb + dt = Pb + 2Db - dL \qquad (1)$$
$$= (Pb + 2Db) - (Pa + 2Da) + Pa + 2Da - dL$$

If, therefore, the expression "Pb+2Db−dL" is used to express the reception time in equation (1), since Pb and dL are known, the reception time can be obtained by calculating the propagation time Db.

Db represents the propagation time from the base station B 103 to the mobile station M 105. If Db is to be obtained independently, since the location of the mobile station M 105 is unknown, the entire site range of the base station B 103 must be searched.

Assume that "(Pb+2Db)−(Pa+2Da)+Pa+2Da−dL" in equation (1) is used as an expression representing the reception time.

Pa+2Da is the reception timing in the base station A 10L and a known value.

In addition, since dL is the long code phase difference and can be detected by the mobile station M 105, dL may be regarded as a known value.

(Pb+2Db)−(Pa+2Da) represents the difference in reception timing between the base station A 101 and base station B 103.

In this case, handover tends to be executed in a place where the site of the base station A 101 overlaps the site of the base station B 103.

Assume that the differences in reception timing between the base station A 101 and base station B 103 are accumulated, the average or the like of the differences in reception timing between the base station A 101 and base station B 103 in the past is calculated (accumulated), and a search for the reception timing in the base station B 103 is executed with the accumulated value being regarded as the median value. In this case, the search range for the base station B 103 can be narrowed.

The processing in the above handover operation will be described in more detail next.

Letting Pa be the long code phase in the base station A 101, Pb be the long code phase in the base station B 103, Da be the propagation time from the base station A 101 to the mobile station M 105, and Db be the propagation time from the base station B 103 to the mobile station M 105, the long code phase timing in the base station A 101 at which the mobile station M 105 receives a signal is represented by (Pa+Da), and the long code phase timing in the base station B 103 at which the mobile station M 105 receives a signal is represented by (Pb+Db).

If the reception timing and transmission timing in the mobile station M 105 coincide with each other, the reception timing in the base station A 101 is given by (Pa+Da+Da), and the reception timing in the base station B 103 is given by (Pb+Db+Db).

The mobile station M 105 measures a long code phase difference {(Pa+Da)−(Pb+Db)} as the difference between the long code phase timing (Pa+Da) in the base station A 101, at which the mobile station M 105 receives a signal, and the long code phase timing (Pb+Db) in the base station B 103, at which the mobile station M 105 receives a signal.

The long code phase difference {(Pa+Da)−(Pb+Db)} differs in sign from the long code phase difference dL=Pb+Db−(Pa+Da) described above. This difference, however, demands no essential change in the following description.

The mobile station M 105 can obtain the above long code difference from the long code frame numbers (e.g., 0 to 65535) included in the notification channels transmitted from the base station A 101 and base station B 103 and the reception timing difference at the time of reception of the notification channels.

In general, the long code phase difference is transmitted from the mobile station M 105 to the base station B 103 through the base station A 101. The base station B 103 can receive a signal from the mobile station M 105 by correcting the long code phase difference {(Pa+Da)−(Pb+Db)} with the long code phase Pb in the base station B 103.

The reception long code phase in the base station A 101 is Pa+2*Da, and the reception long code phase in the base station B 103 is Pb+2*Db. If the long code phase in the base station B 103 is corrected with the long code phase difference {(Pa+Da)−(Pb+Db)}, i.e., the long code phase difference {(Pa+Da)−(Pb+Db)} is added to Pb+2*Db, then $$Pb+2*Db+\{(Pa+Da)-(Pb+Db)\}=Pa+Da+Db$$

With reference to the phase Pa in the base station A, the reception timing in the base station A 101 is given by reception long code phase−transmission long code phase=$(Pa+2*Da)-Pa=2*Da$ The reception timing in the base station B 103 is given by reception long code phase−transmission long code phase=$(Pa+Da+Db)-(Pa+Da-Db)=2*Db$ The difference in reception timing between the base station A 101 and base station B 103 is given by $2*Db-2*Da$ with reference to the reception timing $Pa+Da$ in the base station A 101.

If, therefore, the reception timing difference $2*Db-2*Da$ between the base station A 101 and base station B 103 is known, the reception timing in the base station B 103 can be given by (known reception timing in base station A 101)−(unknown reception timing difference between base station A 101 and base station B 103)

The base station B 103 can therefore receive a signal from the mobile station M 105 without performing a new path search in a wide range.

The reception timing in the base station A 101 can be notified to the base station B 103, together with the long code phase difference.

The reception timing difference between the base station A 101 and base station B 103 can be obtained from the geographical features of the base station A 101 and base station B 103 in many cases.

If, for example, the base stations are arranged as in FIG. 2, the possibility of a start-up of normal soft handover or hard handover in the portion indicted by the dashed line is high.

The reception timing differences in handover from the base station A 101 to the base station B 103 are collected (e.g., the weighted mean using the forgetful coefficients shown in FIG. 4) to be used as correction values for the reception timing in handover from the base station A 101 to the base station B 103.

As the handover start-up range increases, the reception timing error increases. However, the search range for resynchronization can be set to be much narrower than that in the case wherein a search is made up to the maximum delay in a site without making any correction to the reception timing.

An example of a propagation delay in the spread spectrum communication system according to the present invention will be described below with reference to FIG. 7.

Figure 7:
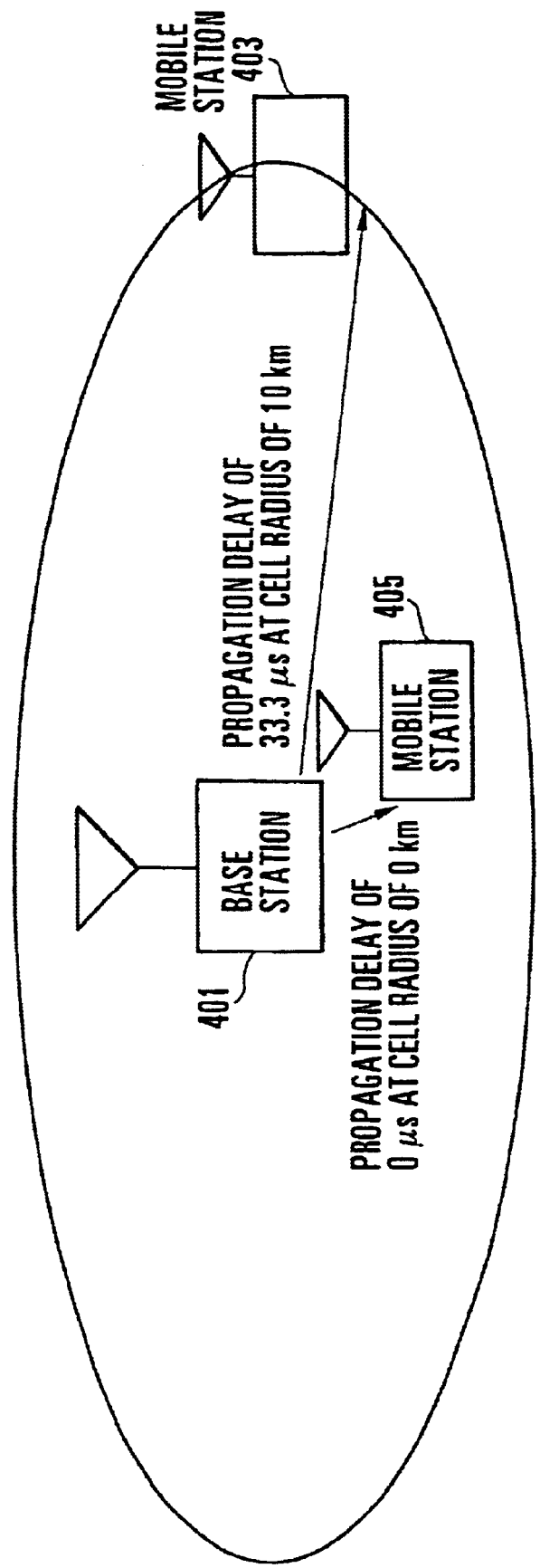
FIG. 7 is a schematic view showing an example of a propagation delay in the spread spectrum communication system according to the present invention.

FIG. 7 schematically shows an example of a propagation delay in the spread spectrum communication system according to the present invention.

As shown in FIG. 7, when the site radius (cell radius) is 10 km, the propagation delay in reciprocating communication is given by $10,000[m]*2[\text{reciprocating communication}]/(3.0*10^8[m/s])=66.7 [\mu s]$ Therefore, the search range is 66.7 $\mu$s.

As shown in FIG. 7, a mobile station 405 is located at a site radius of 0 km when viewed from a base station 401, and hence a propagation delay is 0 $\mu$s. However, a mobile station 403 is located at a site radius of 10 km, and hence the propagation delay is 33.3 $\mu$s.

If, therefore, a search is made from the position of 0 km to the position of 10 km as described above, the search range becomes $33.3*2=66.6 [\mu s] \approx 66.7 [\mu s]$.

Processing in handover will be described in mode detail below with reference to FIG. 8.

Figure 8:
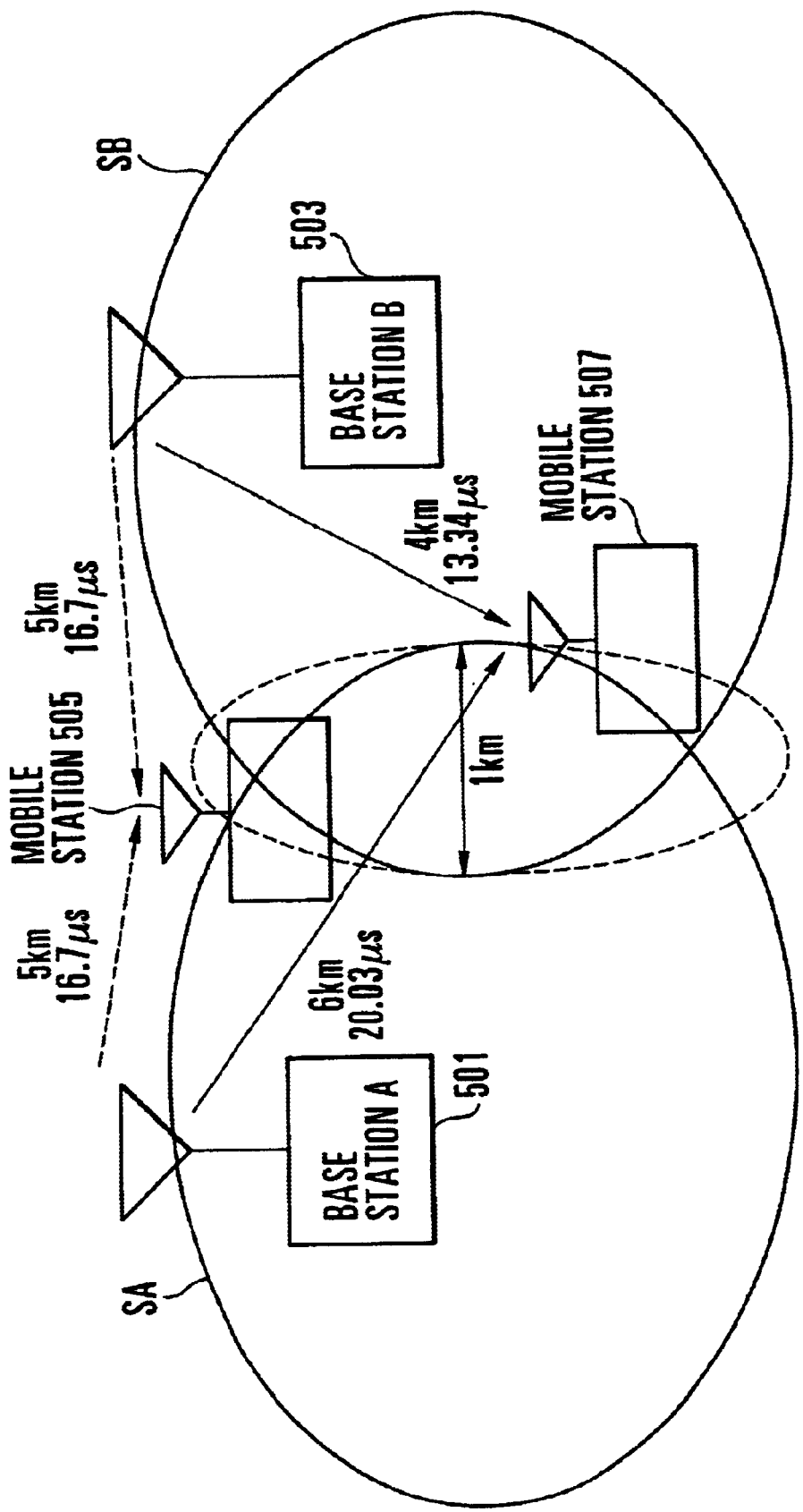
FIG. 8 is a schematic view showing operation in handover processing performed by the spread spectrum communication system according to the present invention.

FIG. 8 schematically shows operation to be performed when the spread spectrum communication system according to the present invention performs handover processing.

As shown in FIG. 8, if the handover start-up range (the portion indicated by the dashed line in FIG. 8) is 1 km, the reception timing error is given by $\pm 500 [m]*2 [2 \text{ routes}]*2 [\text{reciprocating communication}]/(3.0*10^8 [m/s])=\pm 6.7 [\mu s]$ The search range is therefore 13.4 $\mu$s.

In the above equation, the description [2 routes] is made in consideration of the routes viewed from a base station A 501 and base station B 503.

Referring to FIG. 8, a mobile station 505 is located at a site radius of 5 km when viewed from the base station A 501, and hence the propagation delay is 16.7 $\mu$s. A mobile station 507 is located at a site radius of 6 km when viewed from the base station A 501, and hence the propagation delay is 20.03 $\mu$s.

The mobile station 505 is located at a site radius of 5 km when viewed from the base station B 503, and hence the propagation delay is 16.7 $\mu$s. The mobile station 507 is located at a site radius of 4 km when viewed from the base station B 503, and hence the propagation delay is 13.34 $\mu$s.

As shown in FIG. 8, when the mobile station 505 is located at a distance of 5 km from the base station A, the reception timing difference between the base stations is given by $(16.7+16.7)-(16.7+16.7)=0.0 [\mu s]$ When the mobile station 507 is located at a distance of 4 km from the base station B, the reception timing difference between the base stations is given by $(20.0+20.0)-(13.3+13.3)=13.4 [\mu s]$ The different between the reception timing in a mobile station located at a distance of 5 km from the base station A 501 and the reception timing in the mobile station located at a distance of 4 km from the base station B 503 is given by $|0.0-13.4|=13.4 [\mu s]$ In general, since a reception timing difference of about $13.4/2=6.7 [\mu s]$ can be obtained by averaging the past reception timing differences, a search for a reception timing is made within a range of 0 to 13.4 $\mu$s having this average value, i.e., 6.7 $\mu$s, as a median value.

If, for example, the reception timing in the base station A 501 is 20.0 $\mu$s, the reception timing in the base station B 503 is assumed to fall within the range of $20.0\pm 6.7$ $\mu$s. In this case, it suffices if a search is made within the range of 13.3 to 27.6 $\mu$s.

As is obvious from a comparison with the case in FIG. 7, in this case, the search range is about ⅕ that in the case wherein the entire site range is searched.

This means that the circuit scale of a searcher for traffic signals is ⅕ that in the case of a control channel for a search throughout the entire site radius, or the variance decreases to ⅕ and the peak detection ability can be considerably improved if the circuit scale remains the same.

In addition, if the reception timing difference in handover from the base station A to the base station B and the reception timing difference in handover from the base station B to the base station A are discriminated, the search range can be further narrowed.

A reception timing may not be obtained by narrowing down the search range in handover depending on the geographical feature of a place where a mobile station exists (e.g., in a case wherein handover occurs to the base station B when no signal can be received from the base station A because of an obstacle near the base station A). In this case, a path search is made in the entire site range again (0 to 66.7 µs in this case).

In the first embodiment of the spread spectrum communication system according to the present invention shown in FIG. 1, the mobile station M 105 locks a reverse link long code phase with the notification channel in the base station A 101.

Figure 9:
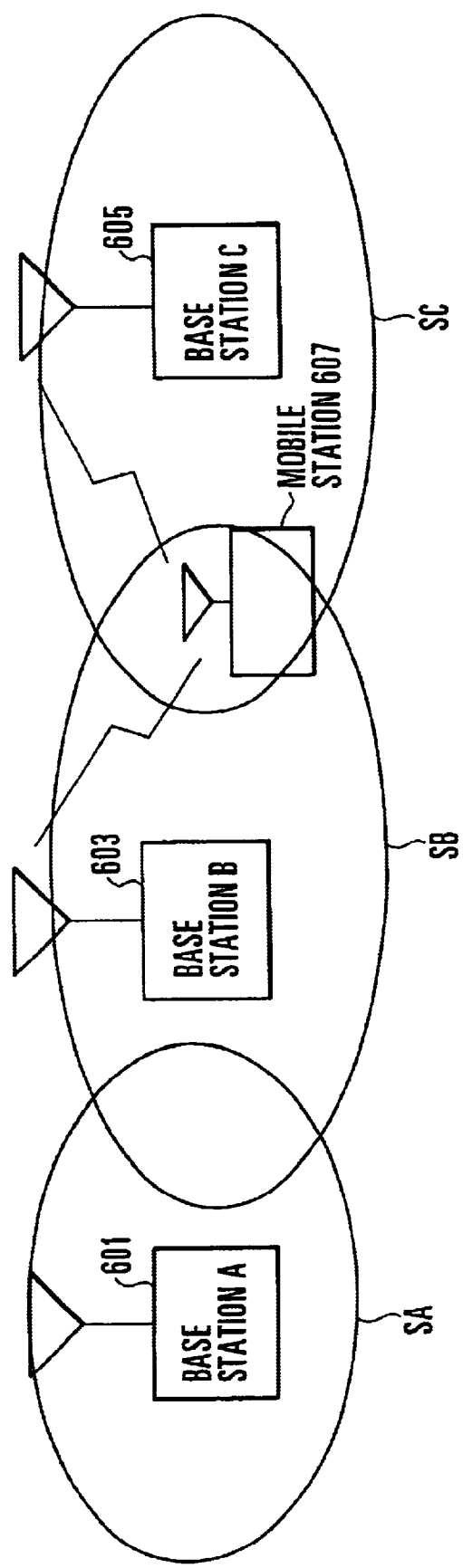
FIG. 9 is a schematic view showing operation to be performed when a mobile station that locks a reverse link long code phase with a notification channel in a base station performs handover from another base station which has another long code phases to still another base station.

As shown in FIG. 9, however, when a mobile station 607 that locks a reverse link long code phase with the notification channel in a base station A 601 causes handover from a base station B 603 to a base station C 605, which have different long code phases, the same function as that of the first embodiment is performed except that the reverse link long code phase is locked with the notification channel in the base station A 601 as a reference.

That is, the spread spectrum communication system and handover method therein according to the present invention can be applied to even the case shown in FIG. 9.

FIG. 9 schematically shows operation in the case wherein the mobile station 607, which locks the reverse link long code phase with the notification channel in the base station A 601, causes handover from the base station B 603 having another long code phase to the base station C 605.

In this case, reference symbol SC denotes the site of the base station C 605.

The second embodiment of the spread spectrum communication system according to the present invention will be described with reference to the accompanying drawings.

The following description of the second embodiment of the spread spectrum communication system according to the present invention includes a description of the second embodiment of the handover method in the spread spectrum communication system according to the present invention.

Since the arrangement of the second embodiment of the spread spectrum communication system according to the present invention is the same as that of the first embodiment of the spread spectrum communication system according to the present invention, which has been described with reference to FIG. 1, a description thereof will be omitted.

The operation of the second embodiment of the spread spectrum communication system according to the present invention will be described with reference to FIGS. 10 and 11.

Figure 10:
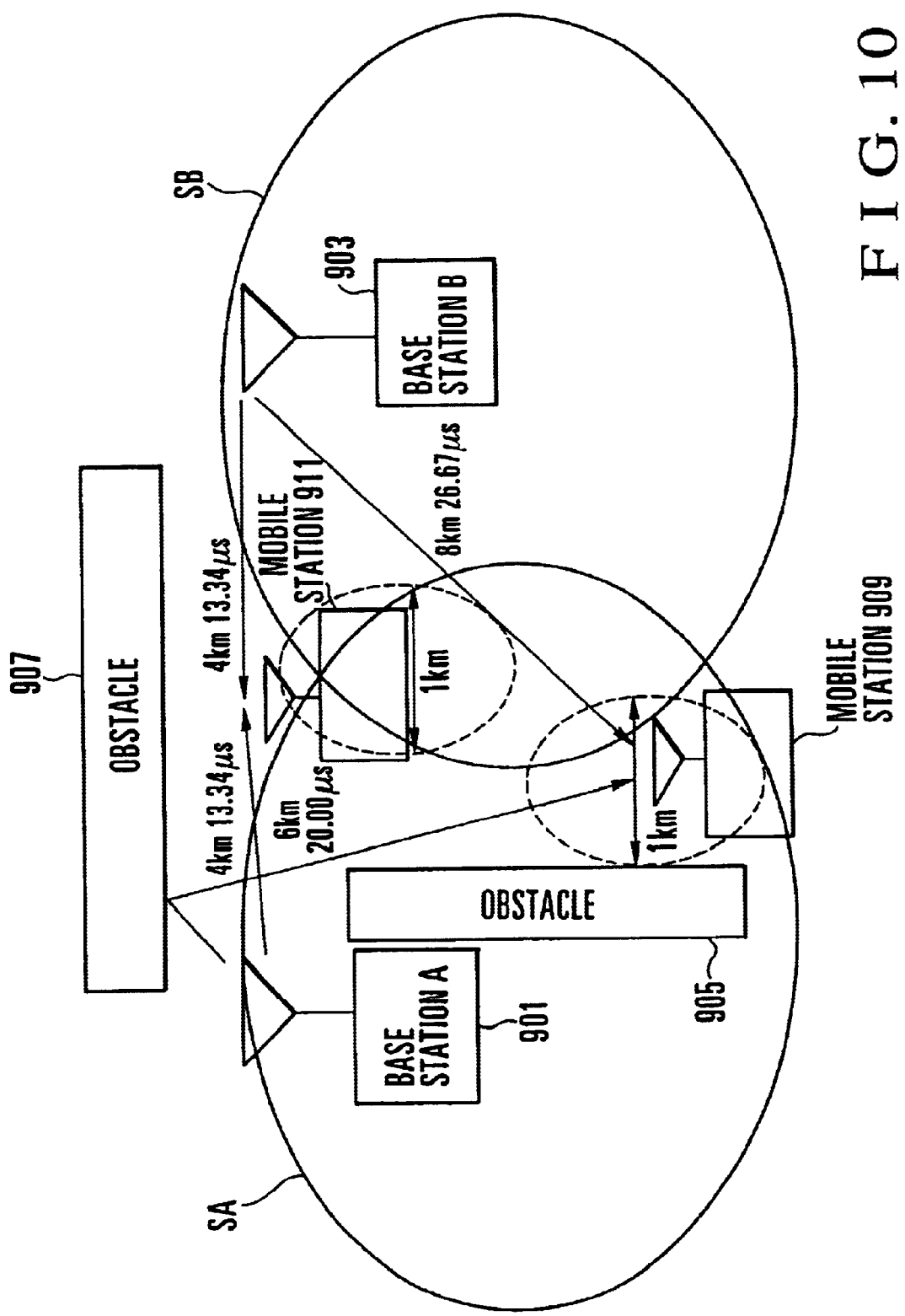
FIG. 10 is a view showing the schematic arrangement of the second embodiment of the spread spectrum communication system according to the present invention.

FIG. 10 shows the schematic arrangement of the second embodiment of the spread spectrum communication system according to the present invention. FIG. 11 shows an example of statistics of the reception timings of a mobile station in a base station A 901 and the reception timings of the mobile station in a base station B 903.

The operation of the second embodiment of the spread spectrum communication system according to the present invention differs from that of the first embodiment in the method of obtaining a search range for the reception timing of a mobile station M in a base station B in a start-up of handover from the site of a base station A to the site of the base station B.

As shown in FIG. 10, if obstacles 905 and 907 such as a building and mountain exist near either the base station A 901 or the base station B 903, handover for mobile stations 909 and 911 from the base station A 901 to the base station B 903 starts up at two points (inside the portions indicated by the dashed lines in FIG. 10).

Figure 11:
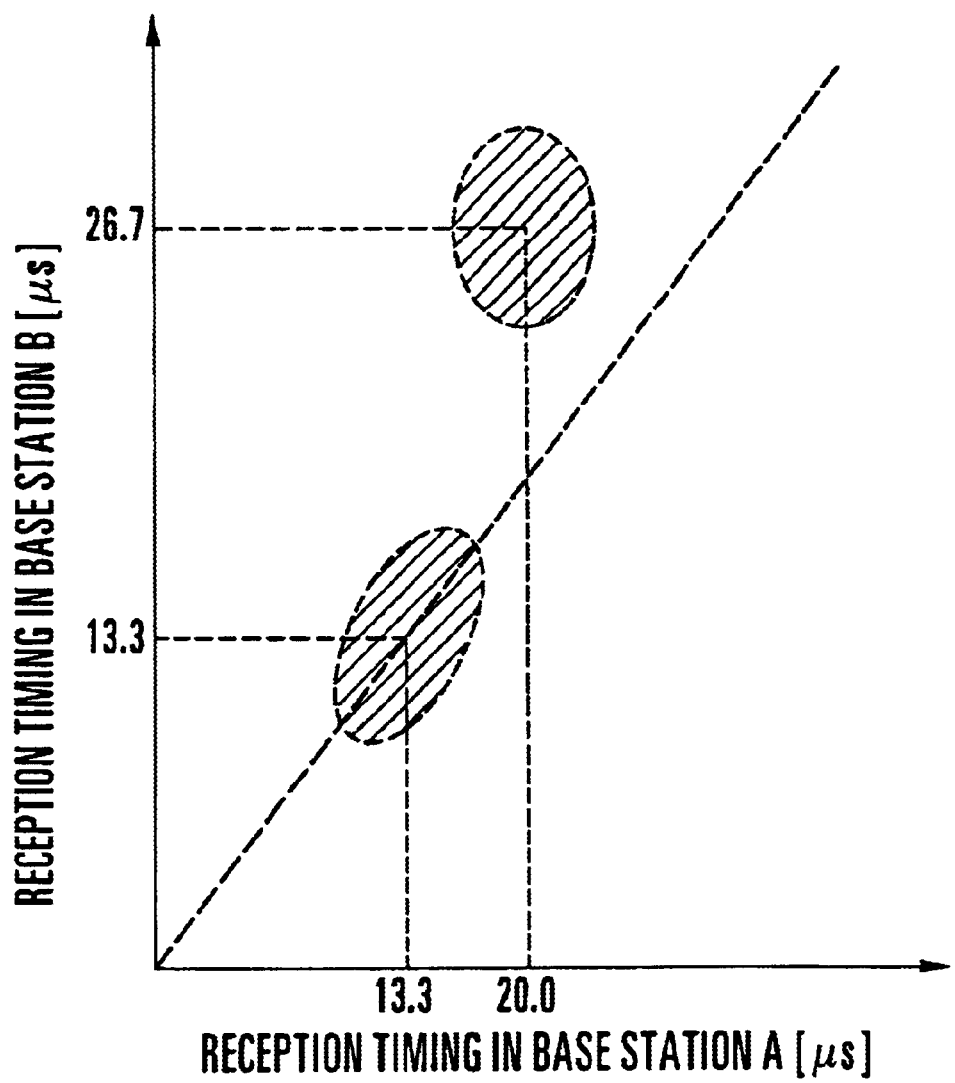
FIG. 11 is a graph showing statistics of reception timings in the second embodiment of the spread spectrum communication system according to the present invention.

FIG. 11 shows statistics of the reception timings of the mobile station in the base station A 901, which are sent from the base station A 901 to the base station B 903, and the reception timings of the mobile station in the base station B 903 at a start-up of handover from the base station A 901 to the base station B 903.

Note that the statistics of the reception timings shown in FIG. 11 are merely an example. For example, statistics including two or more distribution ranges may be used for the spread spectrum communication system and handover method therein according to the present invention.

In this case, if the reception timing of the mobile station in the base station A 901, which is sent from the base station A 901 to the base station B 903, is near 13.3 µs at a new start-up of handover from the base station A 901 to the base station B 903, the search range for the reception timing of the mobile station M in the base station B 903 is set to 13.3 µs±6.7 µs.

If the reception timing in the base station A 901 is near 16.7 µs, search ranges of 13.3 µs±6.7 µs and 26.7 µs±6.7 µs are set for the reception timing of the mobile station in the base station B 903.

This is because the reception timings in the base station B 903 may be distributed around 13.3 µs or 26.7 µs, as shown in FIG. 11.

In addition, if the reception timing in the base station A 901 is near 20.0 µs, the search range for the reception timing of the mobile station M in the base station B 903 is set to 26.7 µs±6.7 µs. In this case, the entire range is searched.

Even if, therefore, obstacles exist near base stations and two or more handover ranges exist as in the second embodiment of the spread spectrum communication system according to the present invention shown in FIG. 10, the search range can be reduced as compared with the case wherein the entire range is searched. This allows quick signal demodulation in a site at a handover destination without making a path search in a wide range.

The third embodiment of the spread spectrum communication system and handover method therein according to the present invention will be described next with reference to FIGS. 12 and 13.

Since the arrangement of the third embodiment of the spread spectrum communication system is the same as that described with reference to FIGS. 1 and 2, a description thereof will be omitted.

Figure 12:
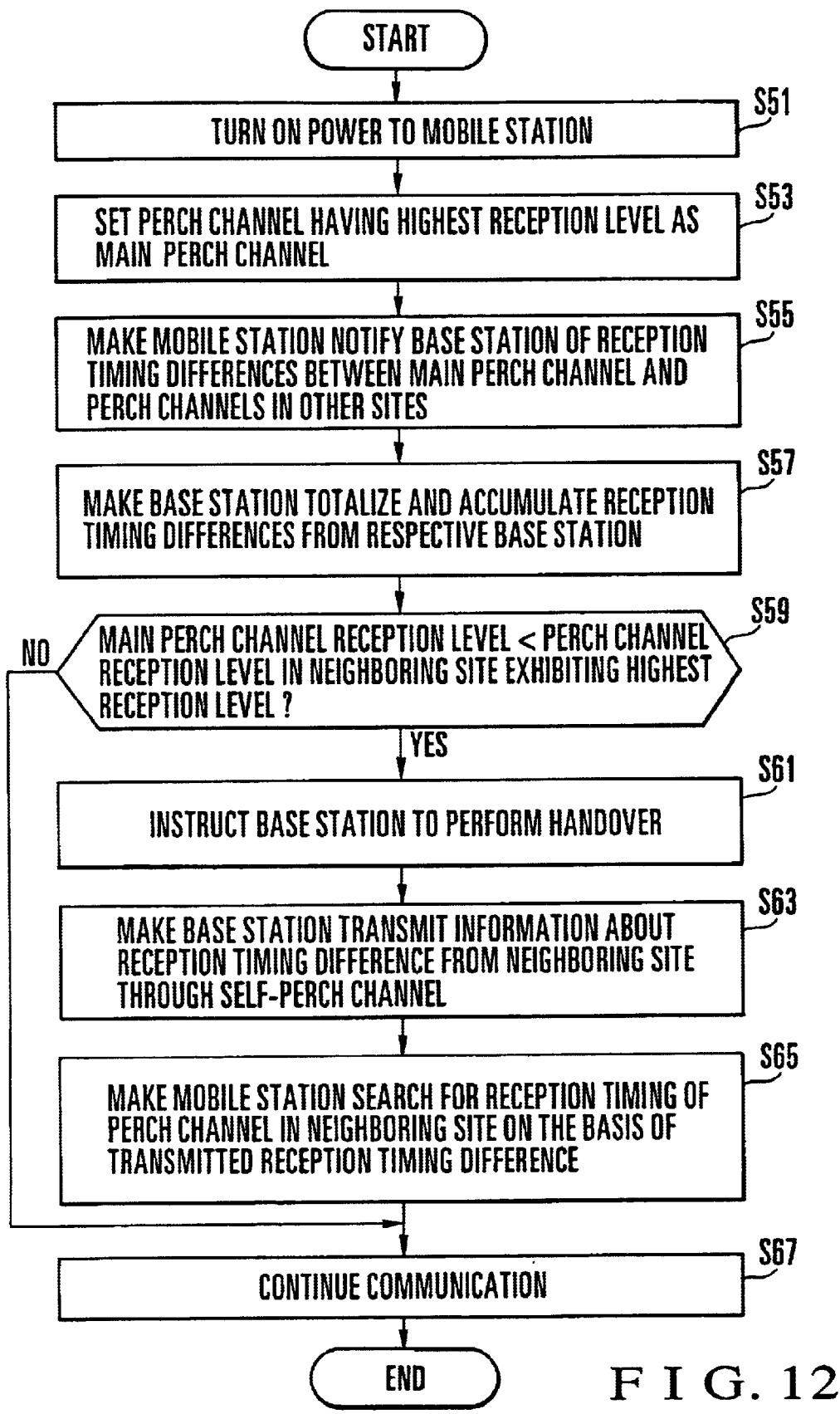
FIG. 12 is a flow chart showing the operation of the third embodiment of the spread spectrum communication system according to the present invention.

FIG. 12 shows the operation of the third embodiment of the spread spectrum communication system according to the present invention.

Note that the following description of the third embodiment of the spread spectrum communication system according to the present invention includes a description of the third embodiment of the handover method in the spread spectrum communication system according to the present invention.

Figure 13:
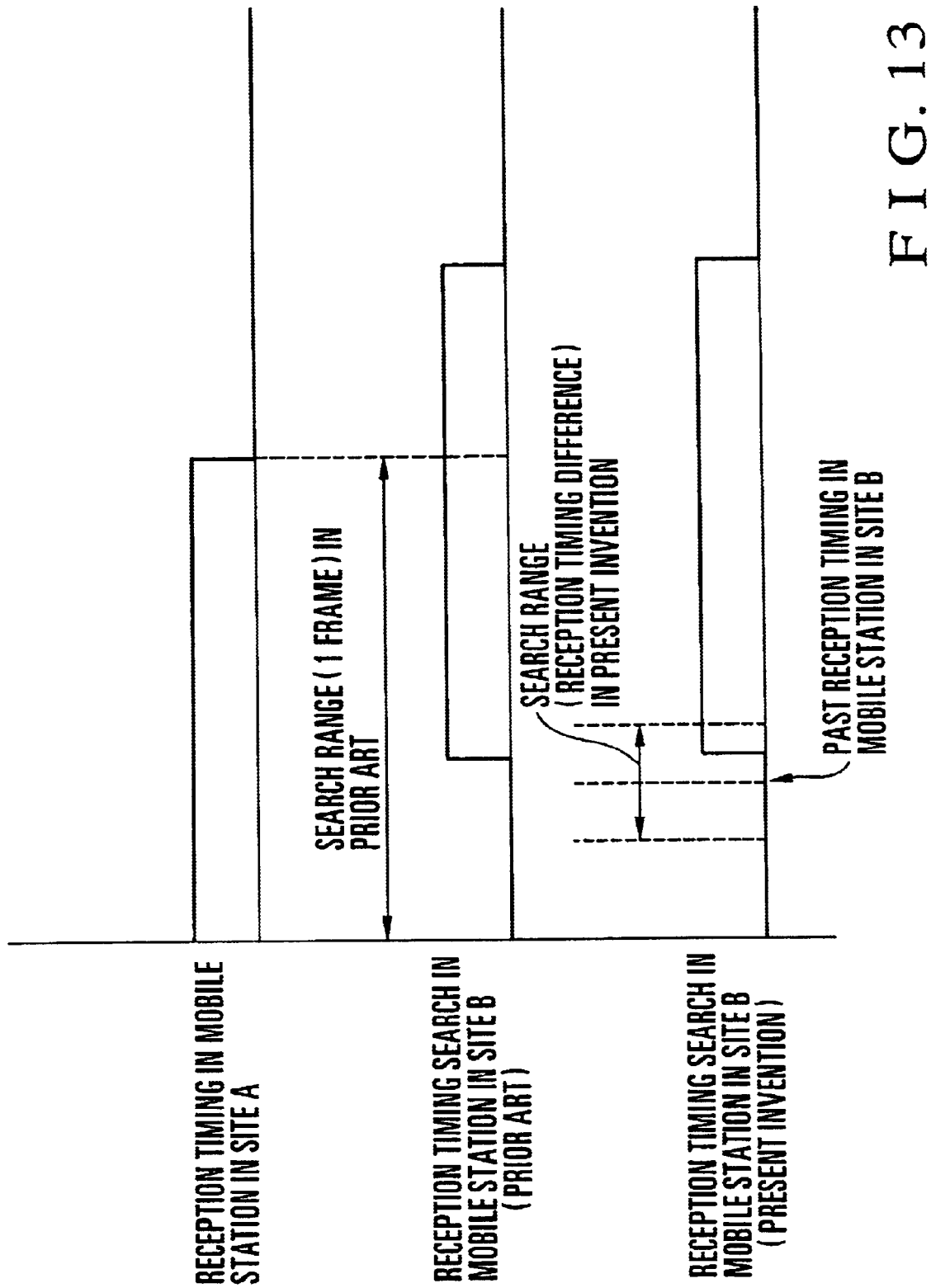
FIG. 13 is a timing chart showing search operation in the third embodiment of the spread spectrum communication system according to the present invention.
Figure 14:
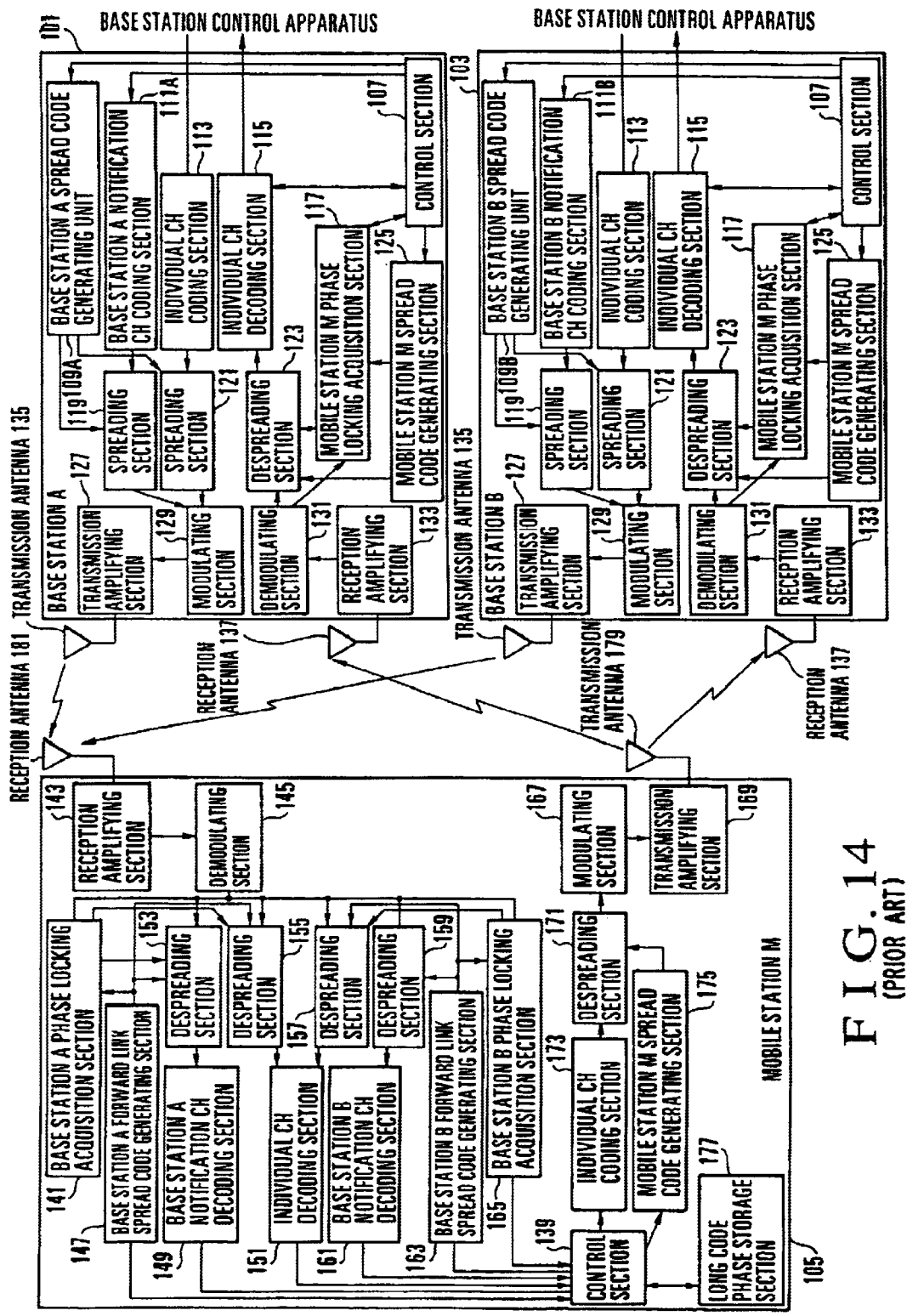
FIG. 14 is a block diagram showing the arrangement of a conventional spread spectrum communication system.

The third embodiment of the spread spectrum communication system according to the present invention, which will be described with reference to FIGS. 12 and 13, is designed to increase the efficiency of the cell (site) search function of a mobile station in handover.

As shown in FIG. 12 as well, in the third embodiment of the spread spectrum communication system of the present invention, in step S51, the power to a mobile station is turned on.

The mobile station then sets a perch channel having the highest reception level as a main perch channel (step S53).

The mobile station notifies a base station of the reception timing differences between the main perch channel and perch channels in other sites (step S55).

The base station totalizes and stores the reception timing differences from the respective base stations (step S57).

This totalizing/storing operation may be executed by weighted mean calculation, as described with reference to FIG. 4.

The mobile station checks whether the reception level of the main perch channel is lower than that of a perch channel, in the neighboring sites, which has the highest reception level (step S59).

If it is determined in step 59 that the reception level of the main perch channel is higher than that of the perch channel, in the neighboring sites, which has the highest reception level (NO), the flow shifts to step S67. Otherwise (YES), the mobile station instructs the base station to perform handover (step S61).

The base station then transmits its perch channel, including information about the reception timing difference from a neighboring site, to the mobile station (step S63).

The mobile station searches for the reception timing of the perch channel in the neighboring site on the basis of the transmitted reception timing difference (step S65).

The mobile station keeps communicating at the searched reception timing (step S67).

As described above, in the third embodiment of the spread spectrum communication system according to the present invention, since a mobile station obtains reception timing information about a neighboring site from a base station, a perch channel in the neighboring site can be received within a search time of about $1/100$ that in a case wherein the reception timing in the mobile station is unknown.

In the prior art, since the timing at which spread codes coincide appears once per frame, it takes one frame (e.g., 10 ms) as a search time for a reception timing to obtain a reception timing for one perch channel.

In this embodiment, since an average reception timing in the past is known, it suffices to make a search in the range between the maximum value of the propagation time between a base station and a mobile station and the minimum value of the propagation time.

Search operation in this embodiment will be further described with reference to FIG. 13.

FIG. 13 shows search operation in the third embodiment of the spread spectrum communication system according to the present invention.

FIG. 13 shows a reception timing in a case wherein a mobile station exists in a site A, a search range for a reception timing in the prior art in which a mobile station performs handover to a site B, and a search range for a reception timing in a case wherein a mobile station according to the present invention performs handover to the site B.

As shown in FIG. 13, in the conventional spread spectrum communication system, a mobile station must search a 1-frame range. In contrast to this, according to the present invention, a search range has a size equivalent to the maximum reception timing difference with a past reception timing serving as a median value.

For example, as described above, since one frame is 10 ms, and the cell size of a base station is about 10 km in general, the propagation time is 0 to 33.3 $\mu$s.

According to the present invention, since it suffices to search a range of ±33.3 $\mu$s at maximum, the search range is 66.6 $\mu$s at maximum. The search range can therefore be considerably reduced.

In the above description, a spread spectrum signal generating scheme used in the spread spectrum communication system and handover method used therein according to the present invention is not specified. However, a direct sequence (DS) scheme is preferably used.

Although codes to be used are not specified, PN code sequences, Gold code sequences, Walsh code sequence, and other code sequence used in spread spectrum communication can be properly used.

As is obvious from the above description, according to the present invention, propagation delay differences (reception timing differences) between sites are accumulated, and the value obtained by correcting the reception timing in a site as a handover source with the reception timing difference is used as the reception timing in a site as a handover destination, thereby reducing the necessity to search a wide range for a reception timing. Therefore, a spread spectrum communication system and handover method therein can be provided, which can reduce a short break in handover between sites.

In addition, since the individual channel search range can be narrowed, the numbers of correlators and multipliers can be decreased. Therefore, a spread spectrum communication system and handover method therein can be provided, which can reduce the scale of an individual channel search circuit and power consumption.

Furthermore, reception timing differences as the differences between the reception timing of a main perch channel and the reception timings of neighboring sites are notified from a base station to allow a mobile station to quickly receive a perch channel in a neighboring site, thereby providing a spread spectrum communication system and handover method therein, which can perform handover in a mobile station at a speed higher than that in the prior art, and a circuit for searching for a perch channel in a neighboring site can be reduced in size.

What is claimed is:

1. A spread spectrum communication system comprising at least one mobile station and a plurality of base stations for communicating with mobile stations in sites thereof by a spread spectrum scheme, each of said base stations including:
        accumulation means for accumulating a first reception timing difference indicating a difference between a first reception timing of a first transmission signal from a mobile station to a first base station in a first adjacent site and a second reception timing of a second transmission signal from said mobile station to a second base station in a second adjacent site; and
        calculation means for obtaining the second reception timing of the second transmission signal from said mobile station to the second base station by using a second reception timing difference between the first base station and the second base station acting as a handover source base station in the second adjacent site, which is accumulated in said accumulation means, when the first base station becomes a handover destination base station upon handover of said mobile station between the first and second adjacent sites.

2. A system according to claim 1, wherein said calculation means comprises correction means for correcting the second reception timing of the second transmission signal from said mobile station to the second base station acting as the handover source base station based on the second reception timing difference, which is accumulated in said accumulation means, thereby obtaining the first reception timing of the first transmission signal from said mobile station to the first base station.

3. A system according to claim 1, wherein said accumulation means comprises:
    addition means for adding a latest reception timing difference between the second base station acting as the handover source base station and the first base station acting as the handover destination base station and a past reception timing difference between the second base station acting as the handover source base station and the first base station, which is accumulated in said accumulation means, based on a predetermined weighting coefficient; and storage means for storing a calculation result obtained by said adding means as a new reception timing difference between the second base station acting as the handover source base station and the first base station.

4. A system according to claim 1, wherein said accumulation means accumulates a plurality of reception timing differences between one handover source base station and the first base station, and said calculation means comprises selection means for selecting at least one reception timing difference as a reception timing difference for obtaining the first reception timing of the first transmission signal from said mobile station to the first base station from the plurality of reception timing differences between the second base station acting as the handover source base station and the first base station, which are accumulated in said accumulation means, based on a reception timing of a transmission signal from said mobile station to the one handover source base station.

5. A system according to claim 1, wherein said mobile station comprises detection means for detecting, as a long code phase difference between the handover source base station and the handover destination base station, a difference between a value obtained by adding a propagation time Da from the handover source base station to the first base station to communication start time Pa in the handover source base station, and a value obtained by adding a propagation time Db from the handover destination base station to the second base station to a communication start time Pb in the handover destination base station, and said calculation means regards the long code phase difference detected in said mobile station as the second reception timing difference, and obtains the first reception timing of the first transmission signal from said mobile station to the first base station by using the second reception timing difference.

6. A system according to claim 5, wherein said calculation means sets a narrow search range for searching for a reception timing of a transmission signal from said mobile station which causes handover to the handover destination base station based on the long code phase difference, a reception timing of a transmission signal from said mobile station to the handover source base station, and the second reception timing difference, which is accumulated in said accumulation means; and searches for the first reception timing of the first transmission signal from said mobile station to the first base station within the narrow search range set by said setting means.

7. A system according to claim 6, wherein the narrow search range has a value PB1 as a median value, which is obtained by PB1=(Pb+2Db)−(Pa+2Da)+Pa+2Da−dL where PB1 is a reception timing of a transmission signal from the mobile station to the handover destination base station, Pa is a communication start time in the handover source base station, Pb is a communication start time in the handover destination base station, Da is a propagation time from the handover source base station to said mobile station, Db is a propagation time from the handover destination base station to said mobile station, and where (Pb+2Db)−(Pa+2Da) is a reception timing difference accumulated in said accumulation means, Pa+2Da is a reception timing of the transmission signal from the mobile station to the handover source base station, and dL is the long code phase difference.

8. A system according to claim 7, wherein said calculation means causes a search range to be set for an entire site, and causes a search for the first reception timing of the first transmission signal from said mobile station to the first base station within the new search range.

9. A spread spectrum communication system comprising at least one mobile station and a plurality of base stations arranged in a plurality of sites to communicate with said at least one mobile station by a spread spectrum scheme, said at least one mobile station notifying a base station of reception timing differences between a main perch channel and a plurality of perch channels in the plurality of sites; and searching for a reception timing of one of the plurality of perch channels in the plurality of sites based on the reception timing differences, and said base station including transmission means for totalizing the reception timing differences notified from said mobile station, and sending a difference in reception timing between the main perch channel and the one perch channel to said mobile station by including the difference in reception timing in a perch channel in said base station transmitted to said mobile station.

10. A handover method in a spread spectrum communication system, comprising the steps of:

causing each of a plurality of base stations located in respective sites to communicate with at least one mobile station located in one of the respective sites by a spread spectrum scheme;

causing each of said plurality of base stations to accumulate a reception timing difference indicating a difference between reception timing of a transmission signal from a mobile station to a base station in an adjacent site and a transmission signal from said mobile station to a self-station; and causing each of said base stations to obtain a reception timing of the transmission signal from said mobile station to the self-station by using an accumulated reception timing difference between the self-station and a handover source base station in an adjacent site when the self-station becomes a handover destination base station upon handover of said mobile station between adjacent sites.

11. A method according to claim 10, further comprising the step of causing said base station to correct the reception timing of a transmission signal from said mobile station to the handover source base station based on the accumulated reception timing difference, thereby obtaining the reception timing of the transmission signal from said mobile station to the self-station.

12. A method according to claim 10, further comprising the steps of:

causing said base station to add a latest reception timing difference between the handover source base station and the self-station and an accumulated past reception timing difference between said handover source base station and the self-station based on a predetermined weighting coefficient; and causing said base station to store a calculation result obtained by said adding as a new reception timing difference between the handover source base station and the self-station.

13. A method according to claim 10, further comprising the steps of:
   causing said base station to accumulate a plurality of reception timing differences between one handover source base station and the self-station; and
   causing said base station to select at least one reception timing difference as a reception timing difference for obtaining a reception timing of a transmission signal from said mobile station to the self-station from the accumulated plurality of reception timing differences based on a reception timing of a transmission signal from said mobile station to the handover source base station.

14. A method according to claim 10, further comprising the steps of:
   causing said mobile station to detect, as a long code phase difference between a handover source base station and a handover destination base station, a difference between a value obtained by adding a propagation time Da from the handover source base station to the self-station to a communication start time Pa in the handover source base station, and a value obtained by adding a propagation time Db from the handover destination base station to the self-station to a communication start time Pb in the handover destination base station; and
   causing said mobile station to regard the long code phase difference detected in said mobile station as a reception timing difference between the handover source base station and the self-station and obtain a reception timing of a transmission signal from said mobile station to the self-station by using the reception timing difference.

15. A method according to claim 10, further comprising the step of causing said base station to set a narrow search range for searching for a reception timing of a transmission signal from said mobile station which causes handover to the self-station based on the long code phase difference, a reception timing of a transmission signal from said mobile station to the handover source base station, and an accumulated reception timing difference between the handover source base station and the self-station and search for a reception timing of a transmission signal from said mobile station to the self-station within the set narrow search range.

16. A method according to claim 10, further comprising the step of causing said base station to set a narrow search range having a value PB1 as a median value, which is obtained by
   $PB1=(Pb+2Db)-(Pa+2Da)+Pa+2Da-dL$ where PB1 is a reception timing of a transmission signal from the mobile station to the handover destination base station, Pa is a communication start time in the handover source base station, Pb is a communication start time in the handover destination base station, Da is a propagation time from the handover source base station to said mobile station, Db is a propagation time from the handover destination base station to said mobile station, and where $(Pb+2Db)-(Pa+2Da)$ is an accumulated reception timing difference, $Pa+2Da$ is a reception timing of the transmission signal from the mobile station to the handover source base station, and dL is the long code phase difference.

17. A method according to claim 16, further comprising the step of causing said base station to set a search range for an entire site and search for a reception timing of a transmission signal from said mobile station to the self-station within the new search range.

18. A handover method in a spread spectrum communication system, comprising the steps of:
   causing each of a plurality of base stations located in respective sites to communicate with at least one mobile station located in one of the respective sites by a spread spectrum scheme;
   causing said at least one mobile station to notify a base station of reception timing differences between a main perch channel having a highest reception level in the respective sites and a plurality of perch channels in the respective sites;
   causing said base station to totalize the reception timing differences notified from said at least one mobile station and send a difference in reception timing between the main perch channel and one of the plurality of perch channels to said mobile station by including the difference in reception timing in a perch channel in said base station transmitted to said mobile station; and
   causing said at least one mobile station to search for a reception timing of the one perch channel based on the reception timing differences.

* * * * *